Dec. 13, 1955 R. MERCER 2,727,095

TELECOMMUNICATION SYSTEMS

Filed April 1, 1952 17 Sheets-Sheet 1

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 2

INVENTOR
Richard Mercer
BY
Lippincott & Smith
ATTORNEYS

INVENTOR
Richard Mercer
BY Lippincott & Smith
ATTORNEYS

Dec. 13, 1955 R. MERCER 2,727,095

TELECOMMUNICATION SYSTEMS

Filed April 1, 1952 17 Sheets-Sheet 4

INVENTOR
Richard Mercer
BY Lippincott & Smith
ATTORNEYS

Dec. 13, 1955 | R. MERCER | 2,727,095

TELECOMMUNICATION SYSTEMS

Filed April 1, 1952 | 17 Sheets-Sheet 5

INVENTOR
Richard Mercer
BY
Lippincott & Smith.
ATTORNEYS

INVENTOR
Richard Mercer
BY Lippincott & Smith
ATTORNEYS

Dec. 13, 1955 R. MERCER 2,727,095

TELECOMMUNICATION SYSTEMS

Filed April 1, 1952 17 Sheets-Sheet 7

INVENTOR
Richard Mercer
BY
Lippincott & Smith.
ATTORNEYS

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 9

INVENTOR
Richard Mercer
BY
Lippincott & Smith.
ATTORNEYS

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 11

INVENTOR
Richard Mercer
BY
Lippincott & Smith.
ATTORNEYS

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 13

INVENTOR
Richard Mercer
BY
Lippincott & Smith
ATTORNEYS

INVENTOR
Richard Mercer
BY
Lippincott & Smith
ATTORNEYS

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 16

INVENTOR
Richard Mercer
BY
Lippincott & Smith
ATTORNEYS

Dec. 13, 1955 R. MERCER 2,727,095

TELECOMMUNICATION SYSTEMS

Filed April 1, 1952 17 Sheets-Sheet 17

INVENTOR
Richard Mercer
BY
Lippincott & Smith
ATTORNEYS 2,727,095
Patented Dec. 13, 1955

2,727,095

TELECOMMUNICATION SYSTEMS

Richard Mercer, London, England

Application April 1, 1952, Serial No. 279,845
Claims priority, application Great Britain April 19, 1951
12 Claims. (Cl. 179—18)

Figure 1:
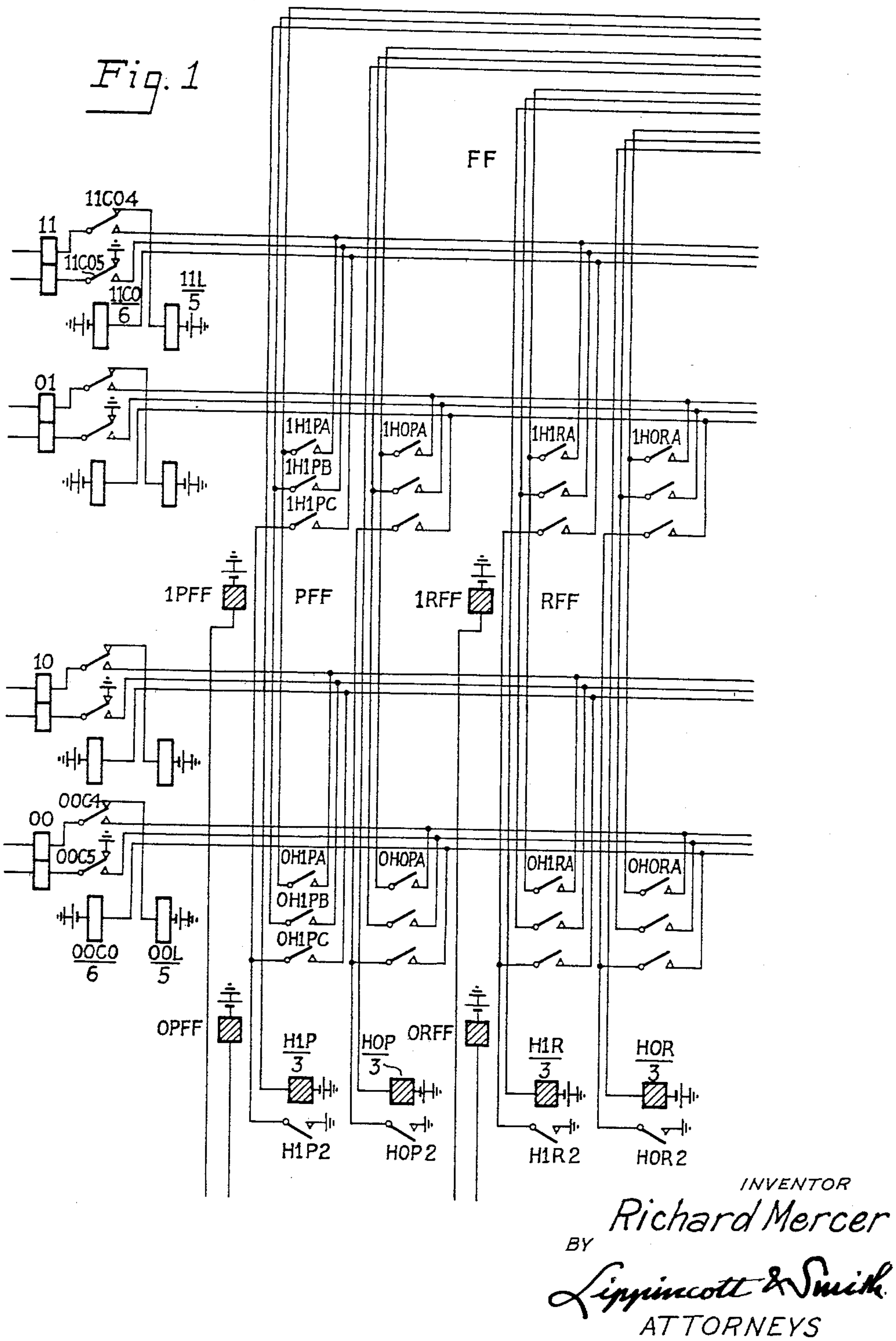
Figure 2:
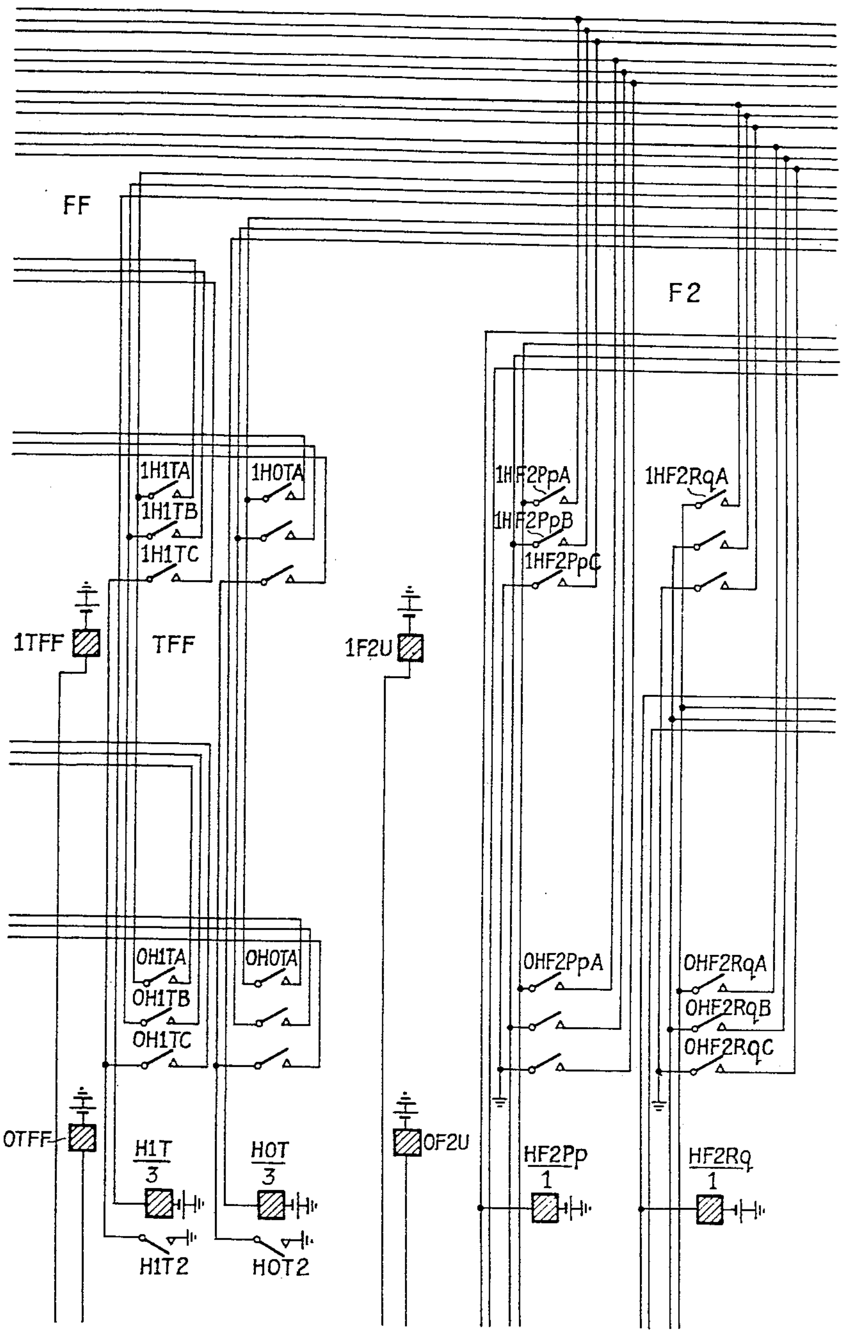
Figure 3:
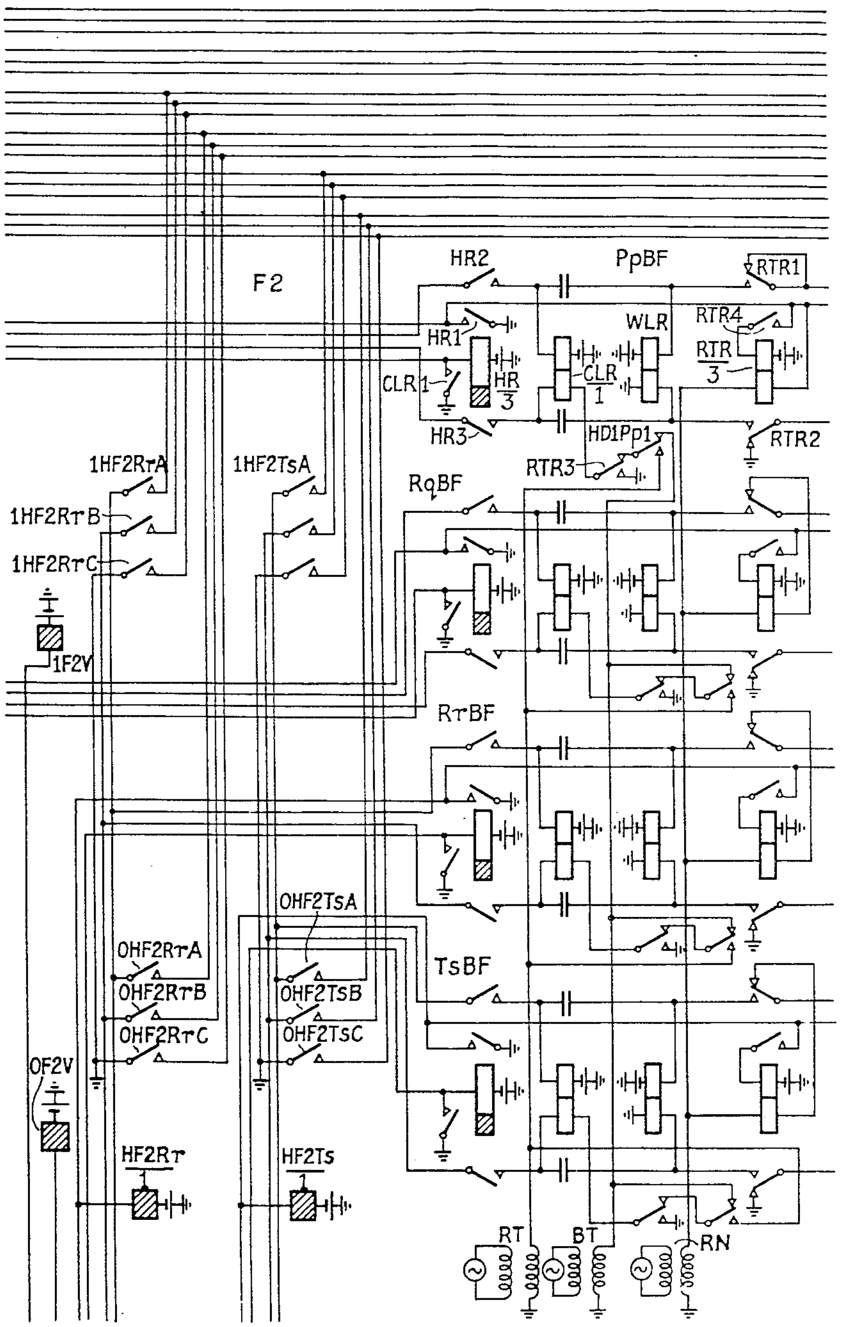
Figure 4:
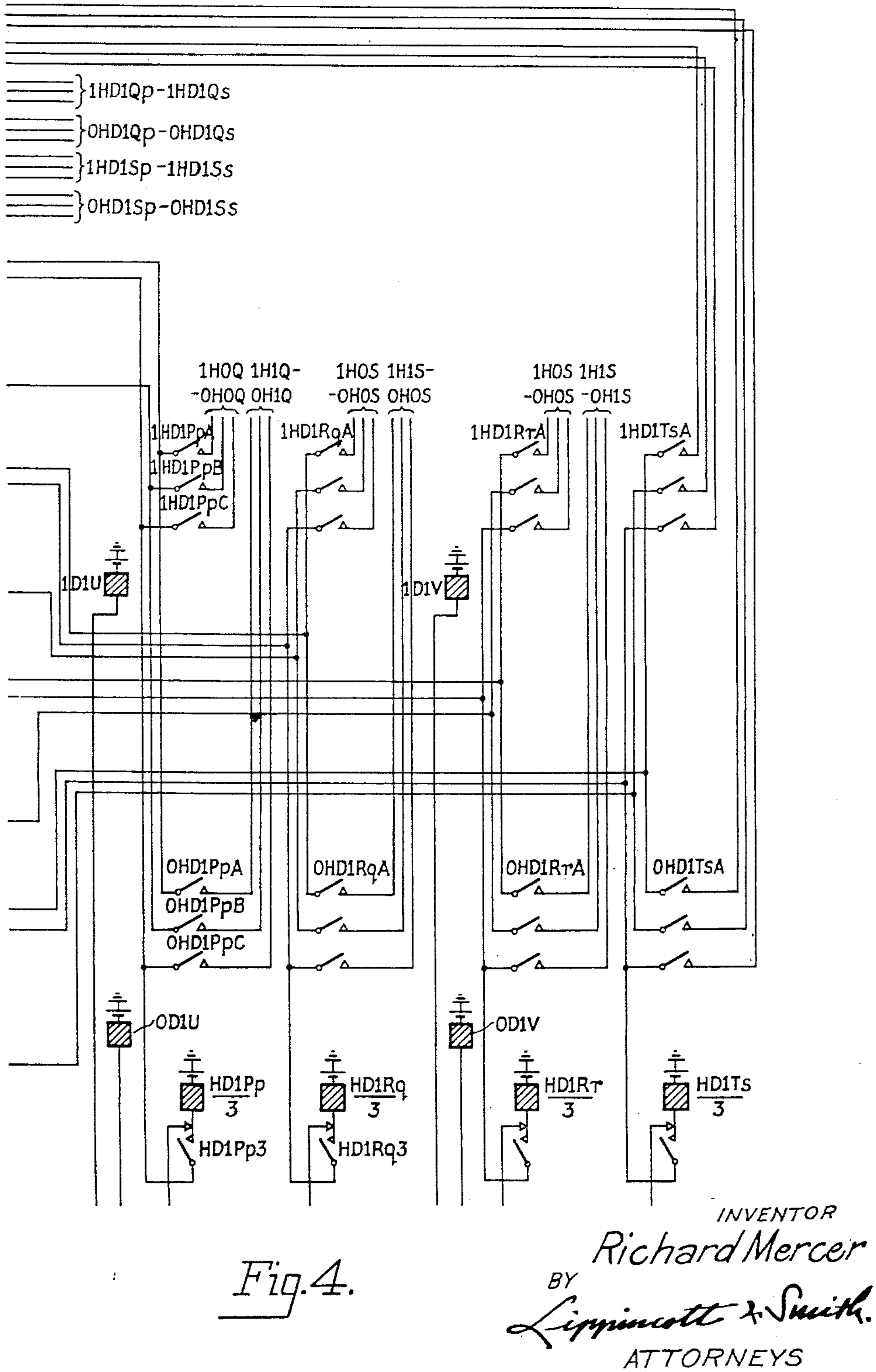

The present invention relates to improvements in telecommunication systems in which connections from the calling party to a called party are adapted to be set up automatically.

The present invention is more particularly concerned with arrangements for testing for the availability of switching routes over which a given connection can be set up. Various proposals have been put forward which involve either providing a marking condition at the end of a train of switches or operating testing devices in successive steps. According to the present invention a testing arrangement for ascertaining the availability of switching routes over a plurality of switching devices arranged in a plurality of successive stages to set up a given connection between one given line and another given line or group of lines is characterised in that a selective device or devices operated in accordance with the connection to be set up is or are arranged to effect the linking up of components of loop testing circuits by making conductive such components as are individually associated with idle switching devices capable of use for setting up the desired connection whereby each completed loop testing circuit corresponds to an available switching route for the given connection.

The arrangement is applicable for connecting a calling line to an idle register device. It is also applicable for setting up a connection from a calling line to a called line, these being two specific examples, it being understood that the invention is applicable generally for the finding of switching routes wherever a plurality of switching devices are arranged in a plurality of successive stages.

According to a further feature of the invention in a telecommunication or like system on the initiation of a call an idle control equipment is taken into use and registers the identity of the calling line and thereafter tests for an available switching route by linking up components of loop test circuits as determined by at least part of the identity of the calling line which loop circuits extend to distinctive responding devices arranged so that only one can operate at a time, such responding devices by selecting an available route also causing the operation of switching devices in the selected route to establish connection from the calling line to the control equipment.

In a further feature of the invention a telecommunication or like system is provided in which control equipment taken into use on the initiation of a call registers the identity of the calling line, tests for and selects an available switching route between the calling line and the control equipment over loop circuits, components of which are linked up in dependence upon the identity of the calling line, controls the operation of switching devices in the selected route to connect the calling line to the control equipment and on the registration of the identity of the called line tests for and selects an available switching route between the calling and called line over modified loop circuits, components of which are linked up in dependence upon the identities of the calling and called line and subsequently controls the operation of switching devices in the selected route to connect the calling line to the called line.

In order to make a component of a loop testing circuit conductive, a contact might be closed in series with a contact which is closed when the switching device with which the component is associated is idle. Alternatively a metal rectifier or other non-linear resistance device which has a high resistance normally and is rendered conductive by the application of an appropriate potential thereto may be used.

The invention is of particular application where the switching devices consist of portions of a crossbar switch controlled by a single hold magnet. According to a further feature of the invention a crossbar switch is provided forming part of the control equipment which is adapted to be successively operated in accordance with the sequence of operations required for the setting up of a connection, a separate hold magnet being operated as each of said operations in the sequence is completed.

The invention will be better understood from the following description of one embodiment taken in conjunction with the accompanying drawings comprising Figs. 1 to 18.

Figure 15:
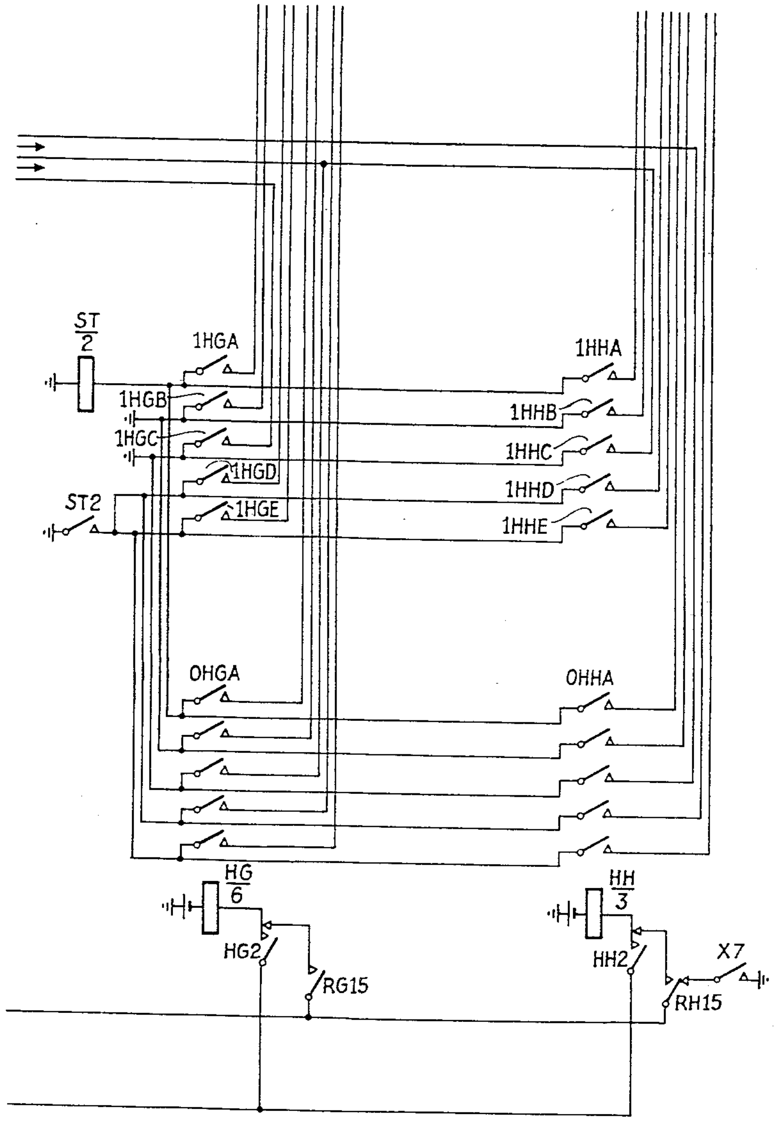
Figure 16:
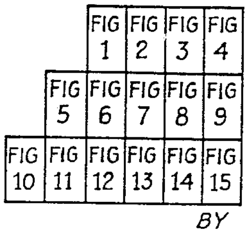
Figure 17:
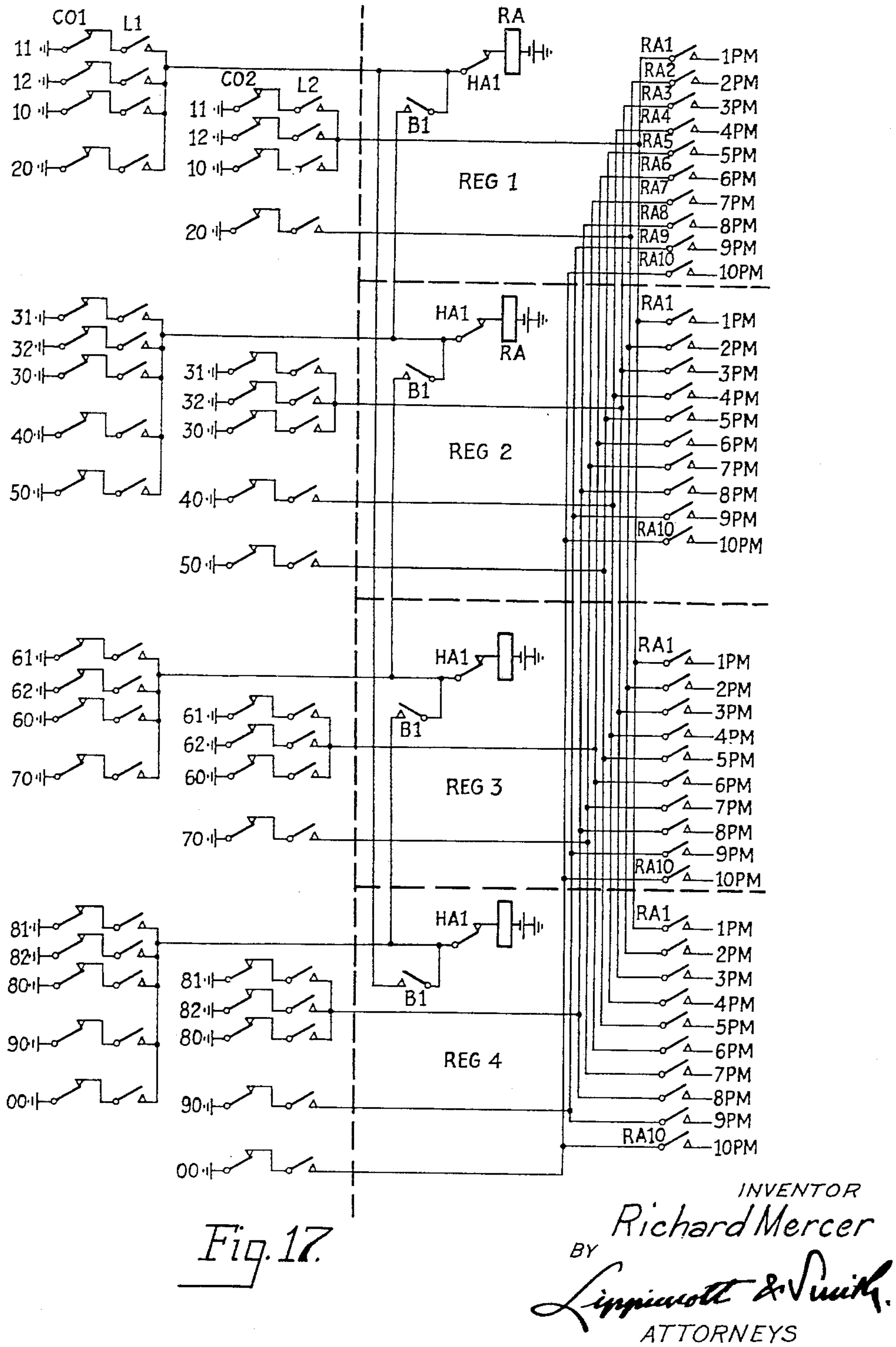
Figure 18:
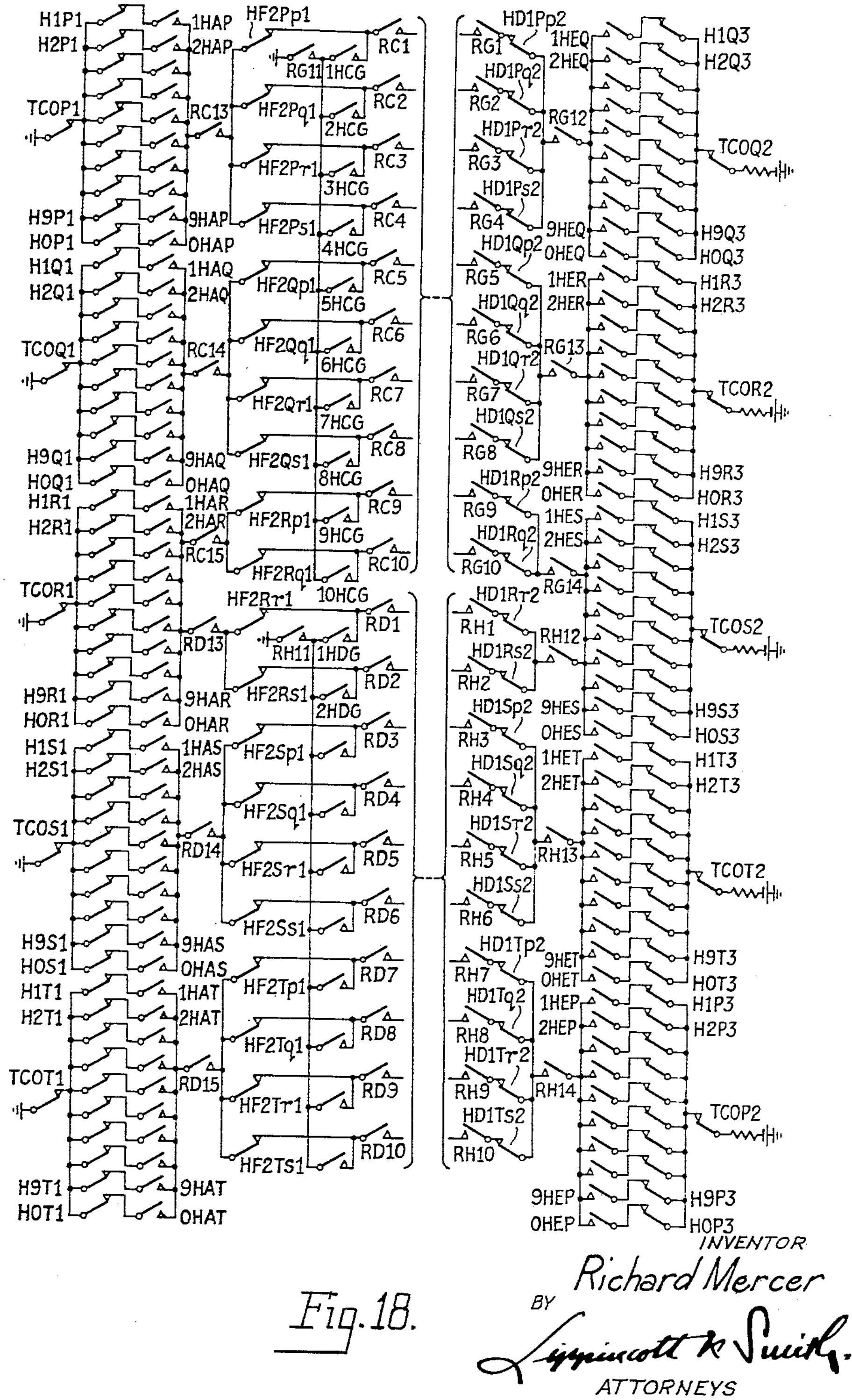

In the drawings:

Figs. 1 to 15 when arranged as shown in Fig. 16 show sufficient of the circuits of a two-digit exchange to enable the invention to be understood, Fig. 17 shows in detail the manner in which different groups of calling lines are allocated among the registers, while Fig. 18 shows in detail the testing circuits which determine the availability of the various routes.

Generally the trunking is similar to that described in my copending application Serial No. 226,131 filed May 14, 1951, after allowance has been made for the different capacities of the exchanges described while the control of the two finder stages is on similar lines to that described in my copending application Serial No. 278,344 filed March 25, 1952, except that cyclic control is not employed.

The main switching devices consist of *a* crossbar switches FF acting as 100 pt. finder finals and *ab* bridge commons F2P*p* to F2T*s* of $$\frac{ab}{10}$$

100 pt. crossbar switches acting as secondary finders and *ab* bridge commons of $$\frac{ab}{10}$$

crossbar switches D1P*p* to D1T*s* acting as first digit switches. The ten bridge commons of each of the *a* crossbar switches have the numerical significances 1 to 0 respectively, each being accessible to *b* bridge commons of the secondary finders, so that the total number of outlets from the primary and secondary finders is *ab*.

Conveniently it has been found that a suitable figure for *a* is five, of which three only PFF, RFF and TFF are shown and a suitable figure for *b* is four of which one bridge common giving access to PFF, two giving access to RFF and one giving access to TFF are shown, divided respectively between crossbar switches F2U and F2V. It may be found that some variations of these figures are desirable to meet different traffic conditions and they can readily be made if found necessary.

One bridge common of a secondary finder 2F and one bridge common of a first digit switch D1 are connected respectively to the incoming and outgoing end of a battery feed set BF including a hold relay HR which also acts as a switching and release relay, a calling line relay CLR, a ring trip relay RTR and a wanted line relay WLR. The control of the busy tone or ringing tone signal is given from level contacts of the hold magnet associated with the bridge common of the first digit switch. The output sides of the bridge common of the first digit switch is connected to a different finder final from that which gives access to the common of the secondary finder P*s*. This is to ensure that calls can be made between lines having the same tens digit otherwise the calls between calling and called line are over distinctive routes and without some such arrangement a finder final of one route acting as a finder would be the same as the finder final acting as a final of the same route.

Before proceeding with a detailed description of the circuits, the method employed for referencing the contacts controlled by the hold magnets, particularly of those crossbar switches in the registers, will be explained. These references are made up firstly of a number which corresponds to the level of the crossbar switch as determined by which of the prepare magnets is operated; secondly by the designation of the hold magnet itself and thirdly by a letter corresponding to the function performed by that contact unless the function has a numerical or route significance in which case it is given a reference corresponding to such numerical or route significance. Thus the letter A in association with HA i. e. HAA represents a contact for connecting up a temporary hold earth and reference 9HAA therefore refers to the contact in the 9th level controlled by hold magnet HA which performs the function of providing a temporary hold earth. In addition, hold magnet HA controls the connecting up of ten units leads for each level, so that the reference 9HA3 indicates the contact on the 9th level controlled by hold magnet HA which connects up the units lead corresponding to the units digit 3. Further hold magnet HA controls contacts for connecting up of test leads from the back contacts of the hold magnets of the various primary finders giving access to the ten line groups having the tens digit corresponding to the operated prepare magnet. These contacts are given the referencets P, Q, R, S and T. Thus reference 9HAP indicates the contact in the 9th level controlled by hold magnet HA which connects up the test lead via hold magnet H9P and its back contact H9P1 of a primary finder P. Finally certain contacts of the hold magnets take part in the circuit operation of the register and these are given references in accordance with the usual practice regarding relay contacts, the number of such contacts being indicated in the hold magnet reference.

Figure 5:
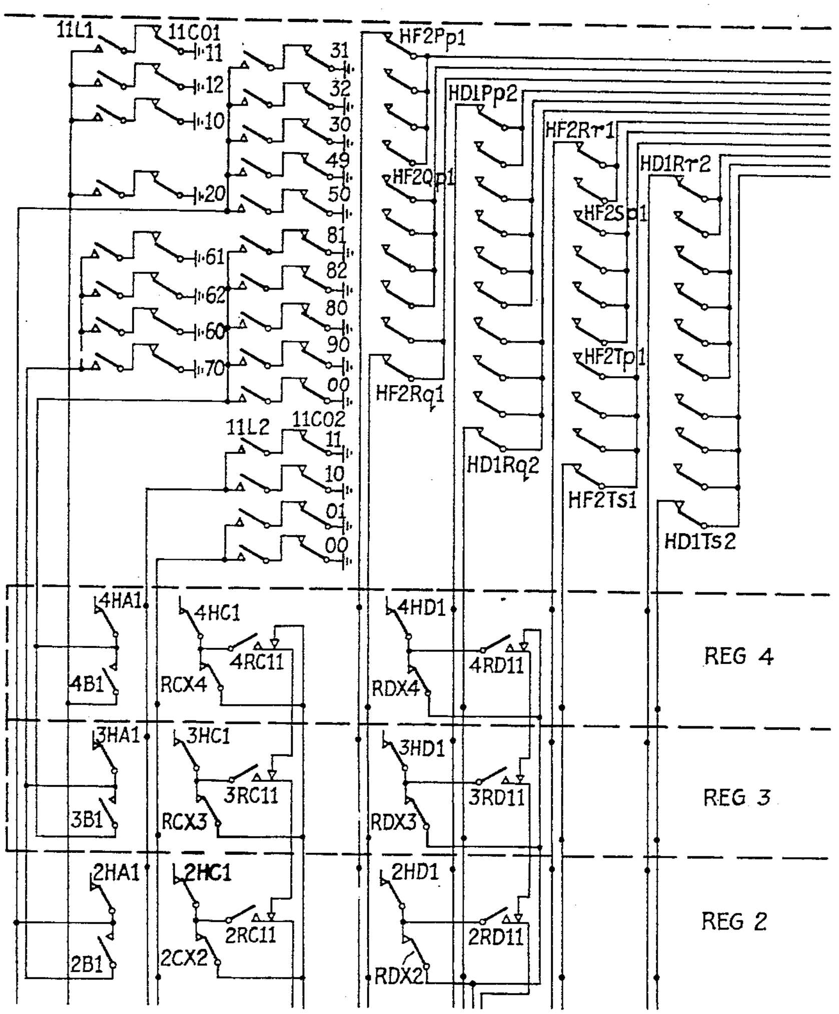
Figure 11:
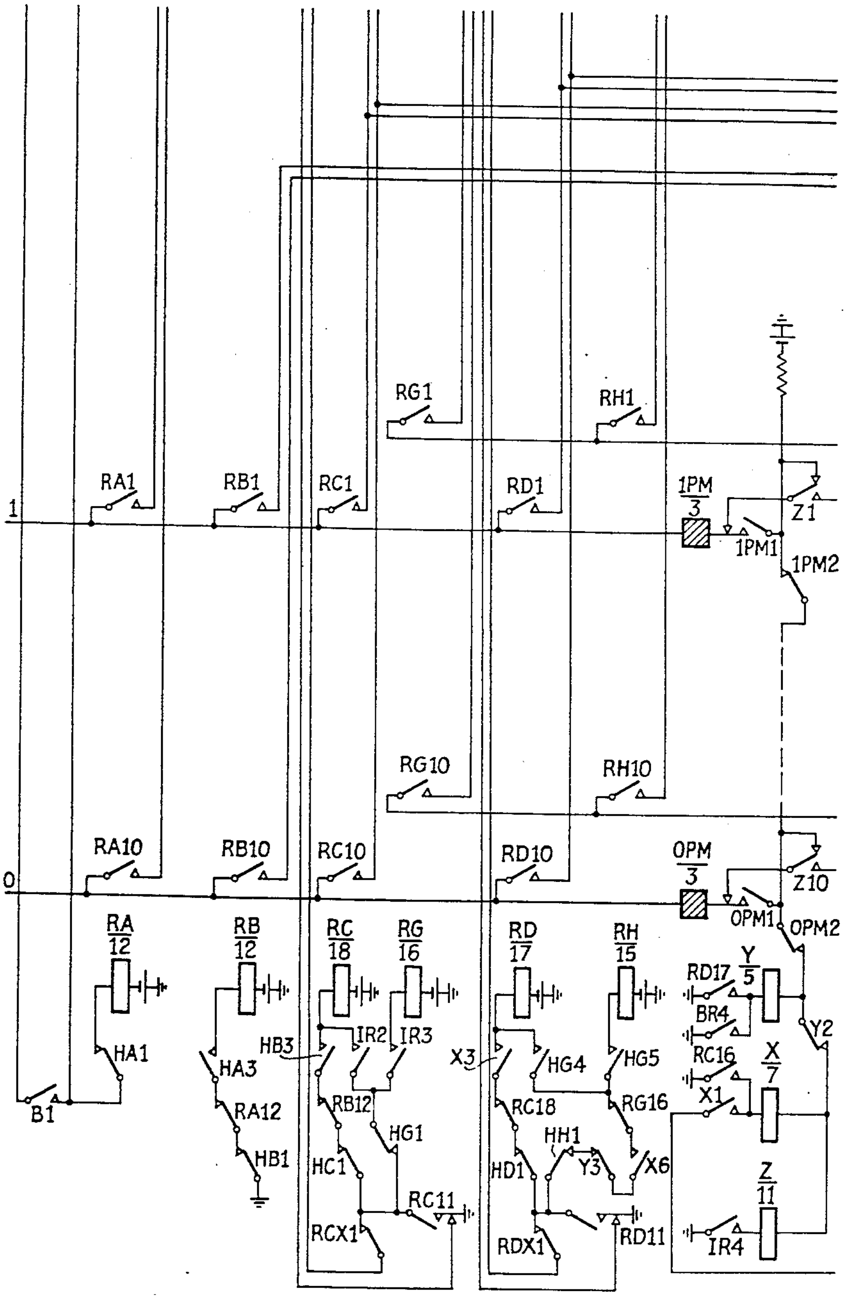
Figure 12:
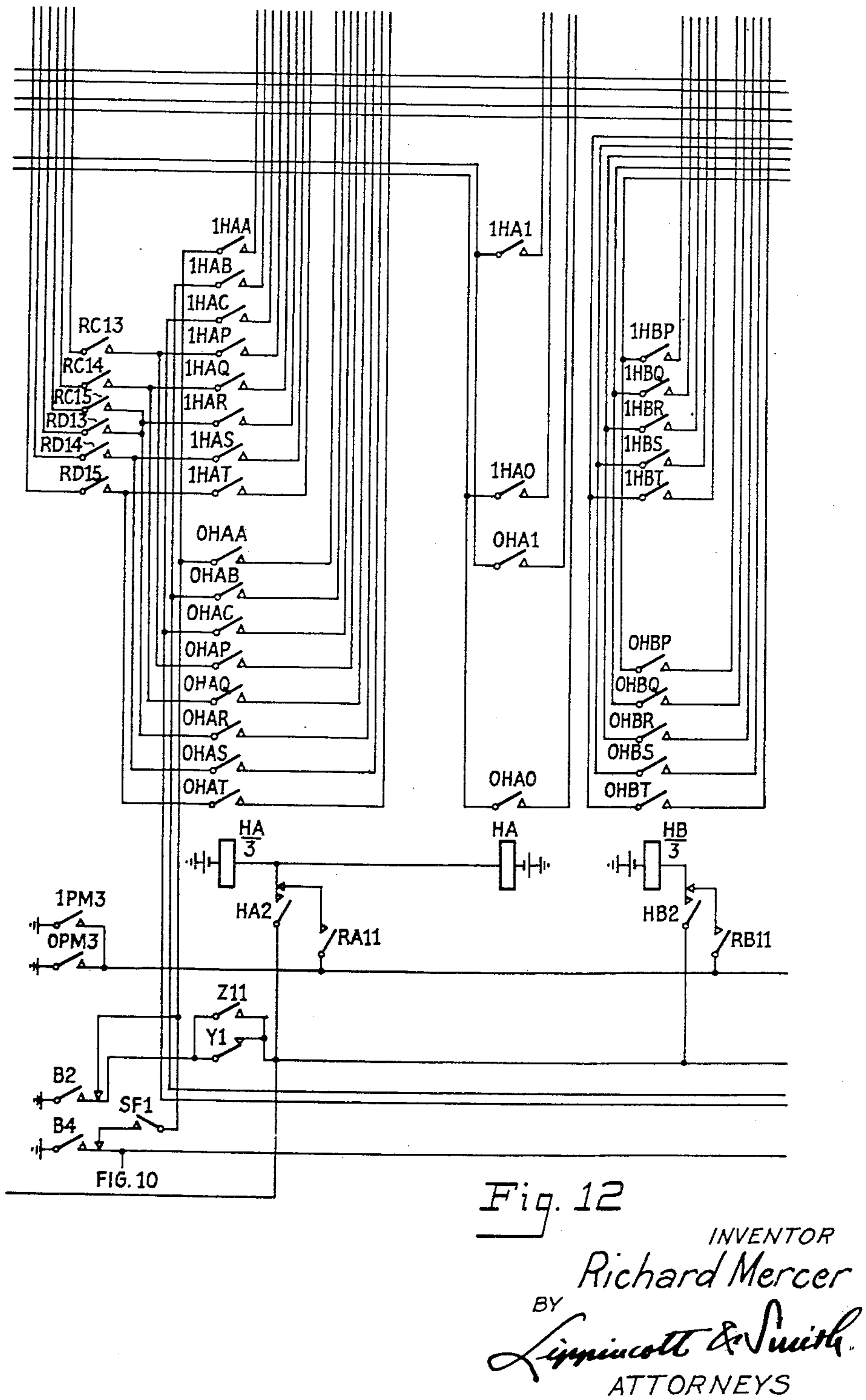
Figure 13:
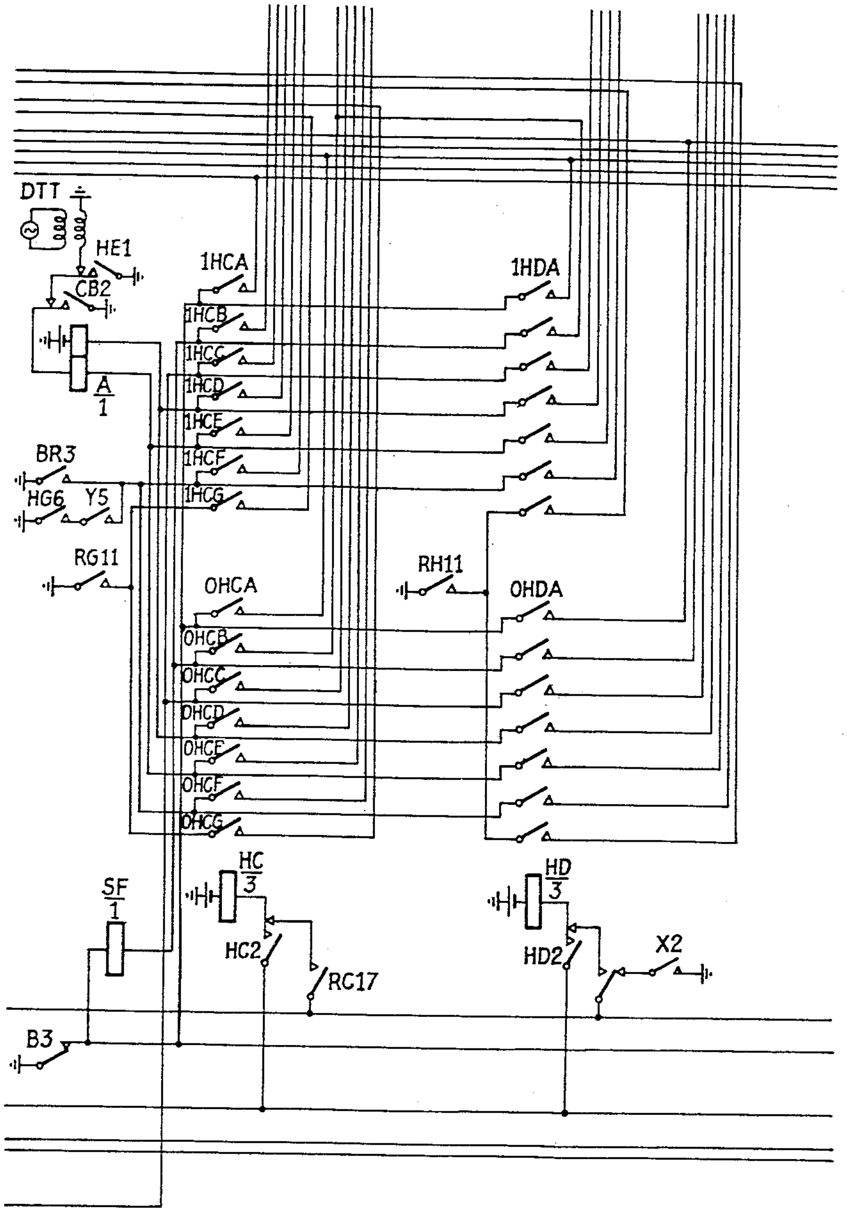
Figure 14:
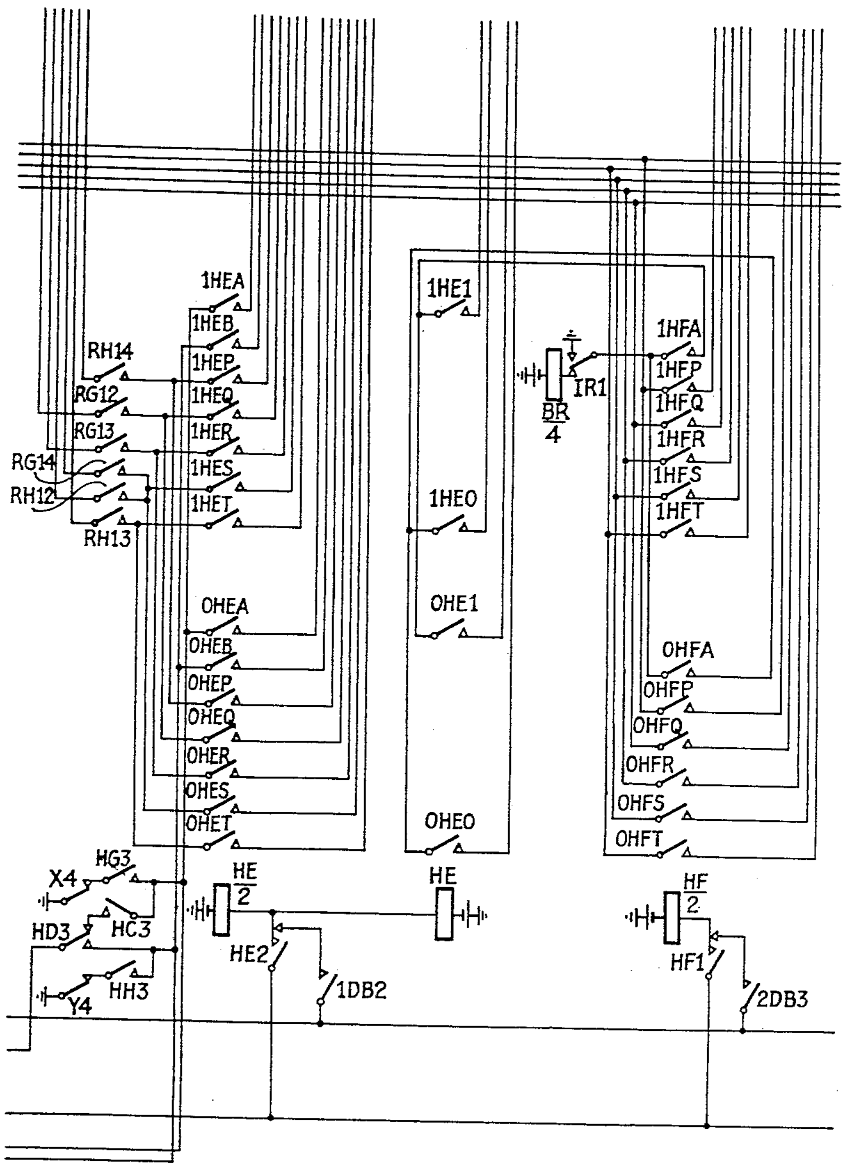

A detailed description will now be given of the setting up of a connection and for this purpose it will be assumed that the subscriber on line 11 (Fig. 1) removes his receiver. Line relay L thereupon operates from earth at contacts 11CO5, subscriber's loop, contacts 11CO4, winding of relay 11L to battery. Relay 11L in operating completes a start circuit to one of the registers, in this case register REG1, the circuit extending as follows: earth, contacts 11CO1 (Fig. 5) 11L1, HA1 (Fig. 11), winding of relay RA to battery. It should be pointed out that different groups of lines have different first, second, third and fourth choice registers. For instance, as shown in Figs. 5 and 11, the group of lines 11–20 have REG1 as first choice, the group of lines 31–50 have REG2 as first choice, the group of lines 61–70 have REG3 as first choice and the group of lines 81–00 have REG4 as first choice. If the first choice register is busy the HA contact will be open and the operation of the release relay B in the register extends the start circuit to the second choice register. For instance, if REG1 is busy when line 11 is calling, contact HA1 is open and contact B1 of the release relay will extend the start earth to register REG2 which is the second choice register for the calling line. Again, if register REG2 is unavailable, the start earth will be extended over contacts B1 of register REG2 to register

REG3 which is the third choice register. Similarly if this is unavailable, the start earth is extended to the fourth choice register REG4. The operation is similar for calling lines in other groups except that the various choices will consist of different registers.

Assuming register REG1 is available, relay RA will operate and it should be explained that since relay RA and also relays RB to RD, RG and RH require a number of contacts in excess of the usual capacity, two or more relays would in practice be connected in parallel. In the drawings, however, a single relay has been shown for simplicity. Relay RA in operating at contacts RA1 to RA10 of which only RA1 and RA10 are shown, connects ten leads to the windings of prepare magnets 1PM to 10PM of which again only 1PM and 0PM are shown. Each of ten leads is connected as shown in Fig. 5 to a series arrangement of a make contact of the line relay and a break contact of the cut-off relay of all subscribers' lines having the same tens digit. Hence when relay RA operates earth is extended over contacts 11CO2, 11L2, RA1, winding of prepare magnet 1PM front contacts 1PM1, contacts Z1 to battery. Prepare magnet 1PM thus operates and locks over front contacts of 1PM1 to battery independent of the contacts of relay Z and at contacts 1PM2 opens the chain circuit by which battery is applied to prepare magnets 2PM to 0PM. Also, prepare magnet 1PM at contacts 1PM3 (Fig. 12) extends earth over RA11 and HA2 to the two hold magnets HA which operate and close the upper set of level contacts 1HAA to 1HAT selected by prepare magnet 1PM to register the tens digit of the calling line. A temporary holding circuit is completed for hold magnets HA from earth at contacts 11L3 (Fig. 6) contacts 1HAA, B2, Y1 and HA2. Also in operating hold magnet HA1 at contacts HA opens the circuit for relay RA which releases and at contacts RA1 to RA10 disconnects the ten leads from the prepare magnets 1PM to 0PM. Prepare magnet 1PM thus releases. Finally at contacts HA3, hold magnets HA close a circuit from earth at contacts HB1, RA12, HA3, winding of relay RB to battery.

It should be explained that the 10 leads extending from contacts such as 11CO2 and 11L2 of the group of lines 11 to 00 will also be connected to RA contacts in the other registers and this is indicated by the dots on the leads which extend from said contacts through the registers.

Figure 6:
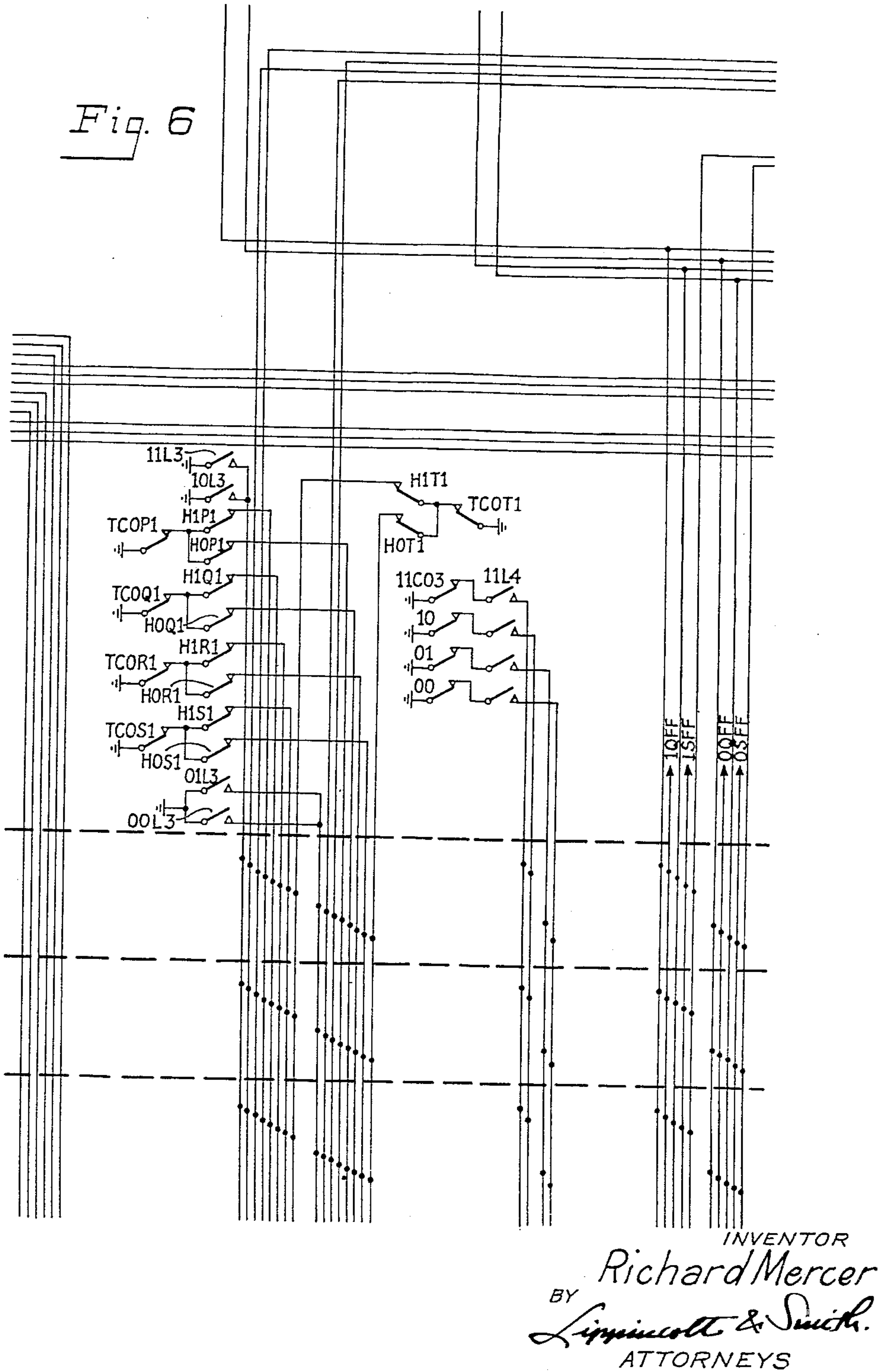
Figure 7:
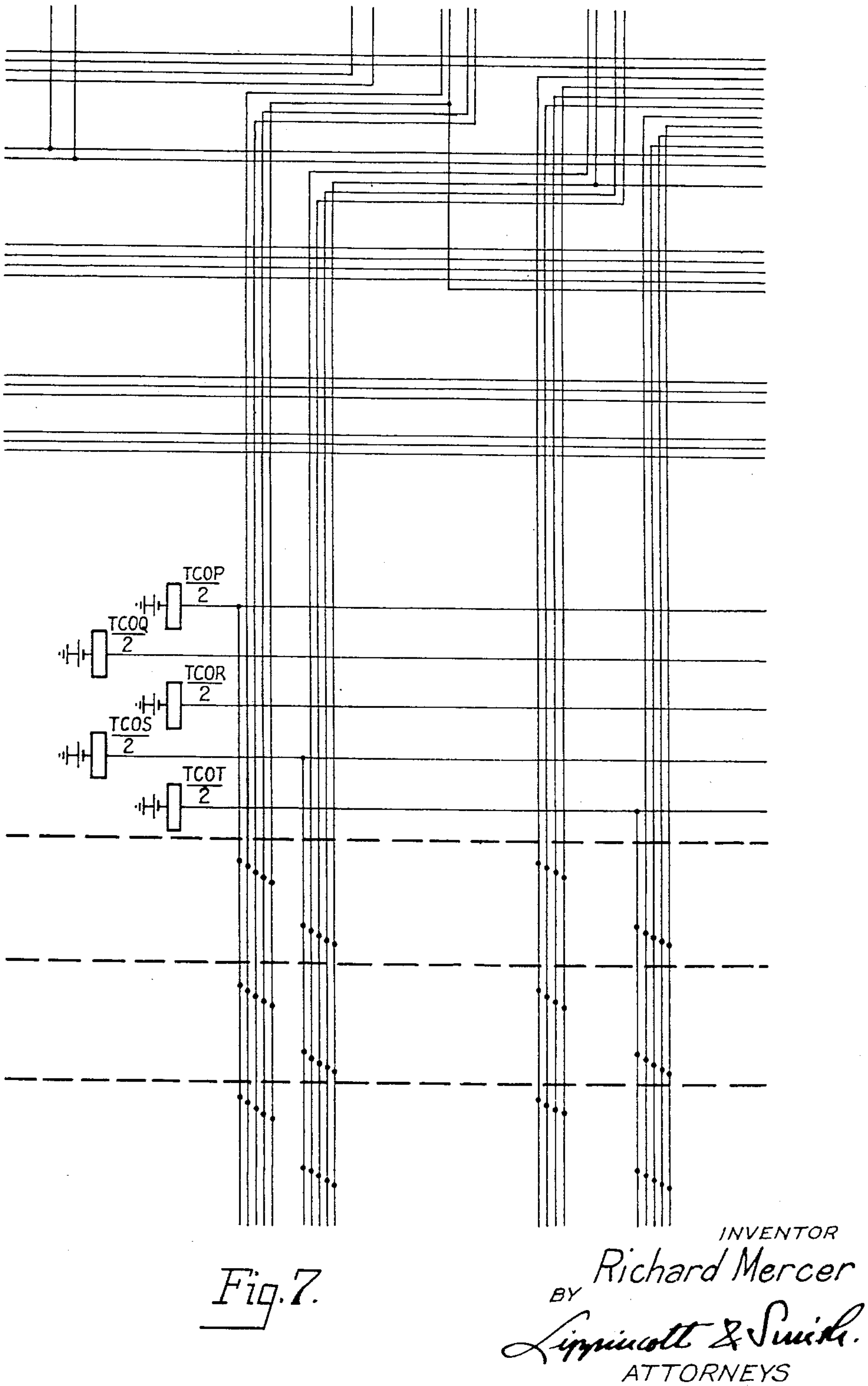
Figure 8:
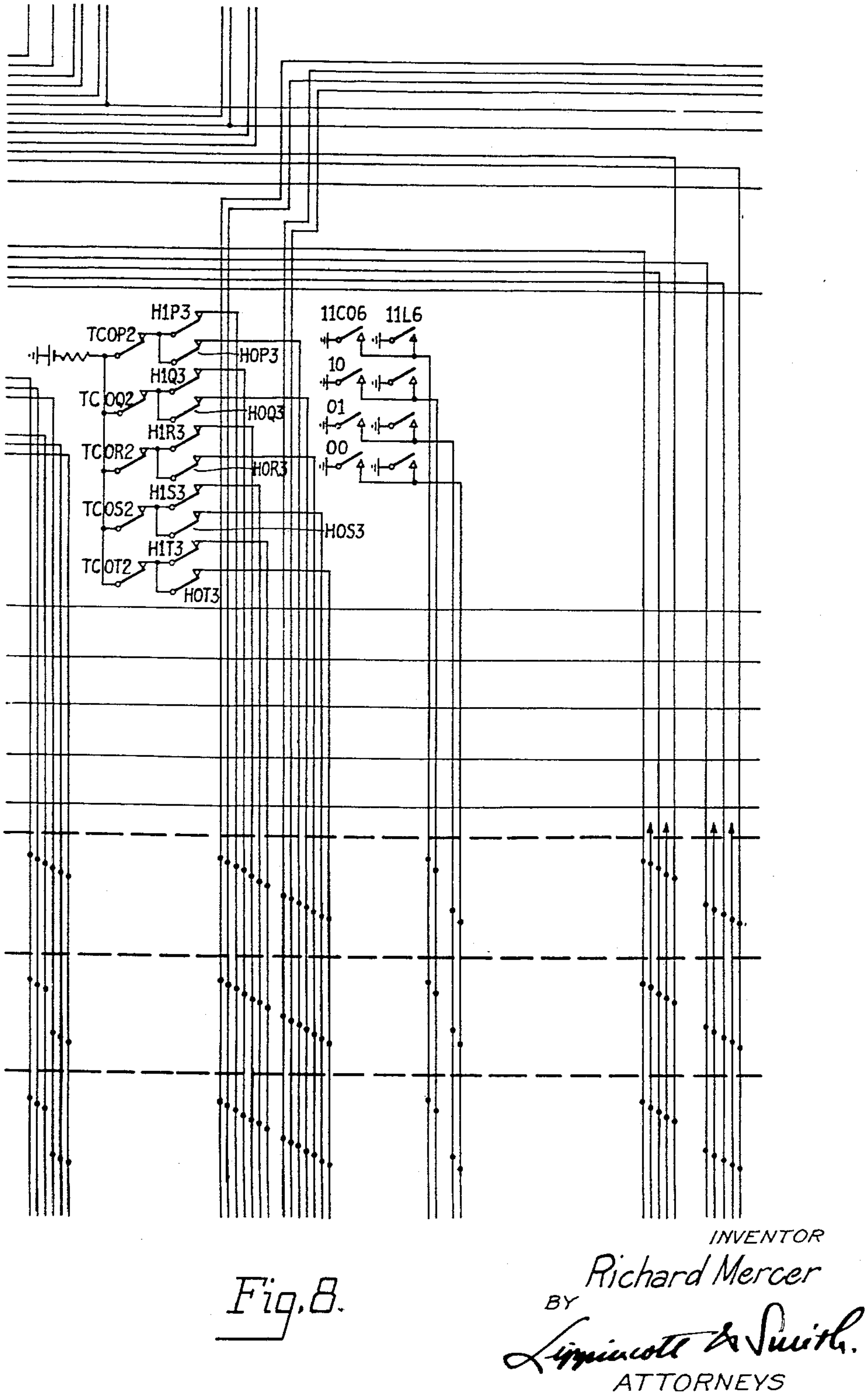
Figure 9:
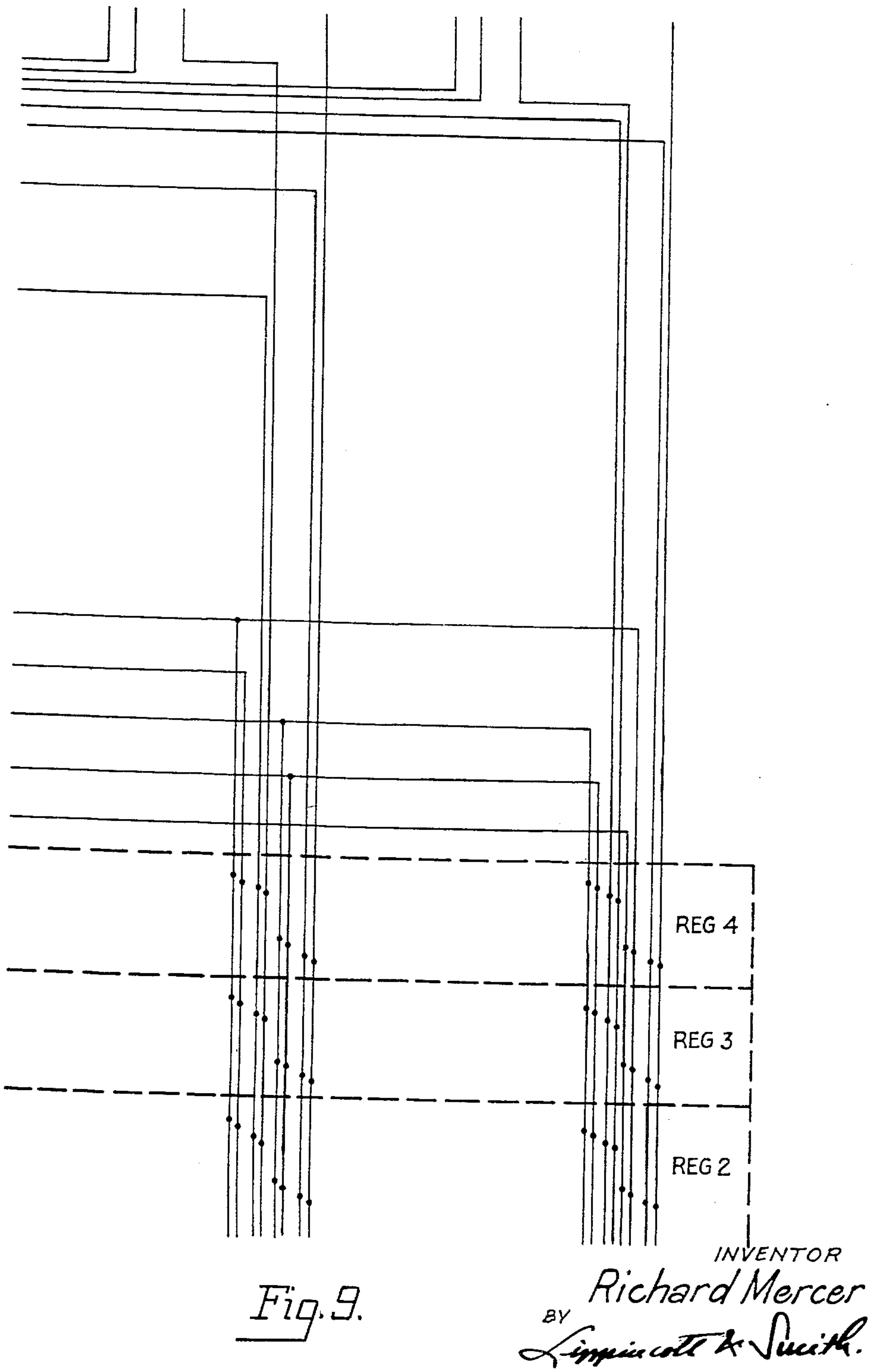
Figure 10:
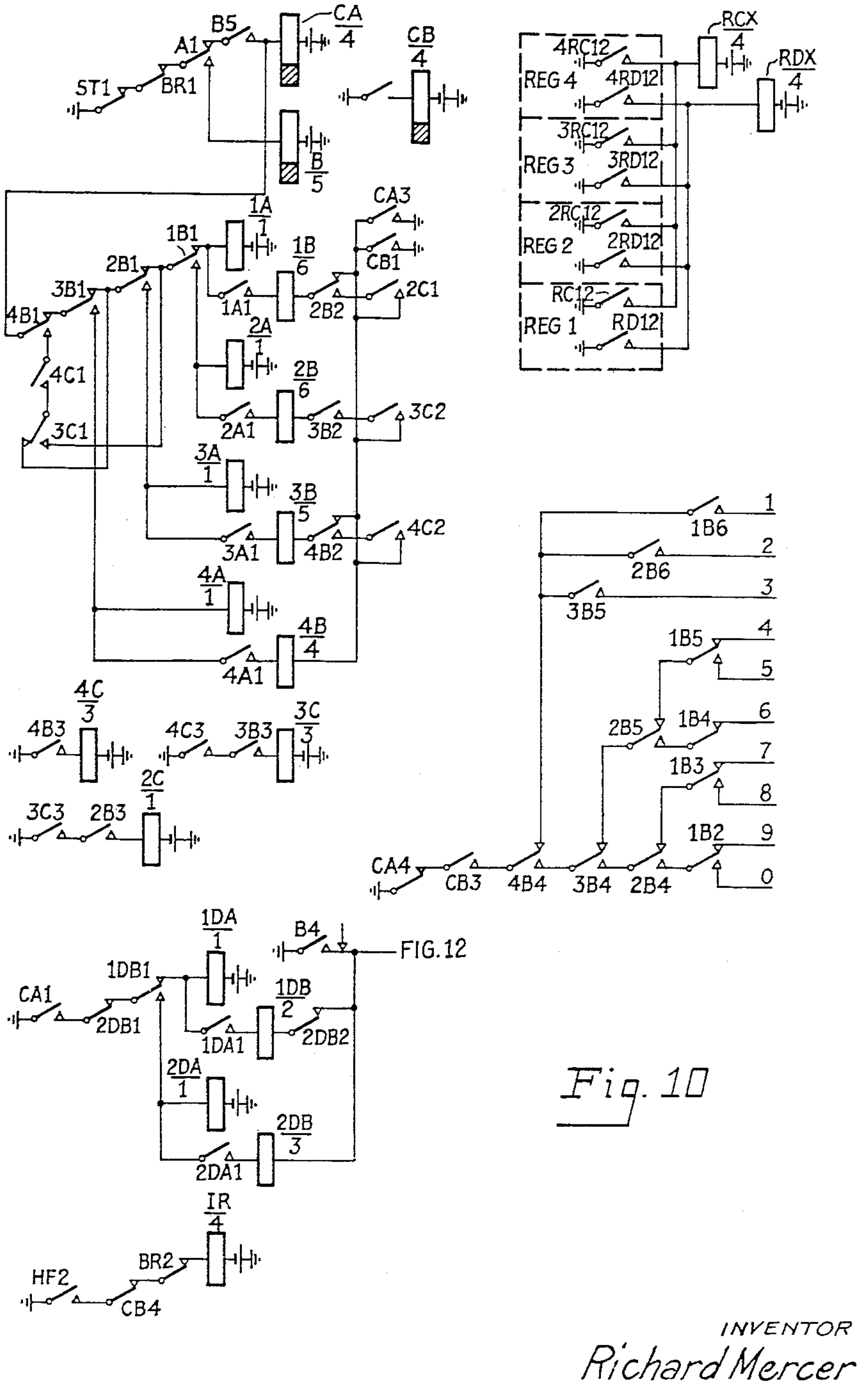

Relay RB now operates and at contacts RB1 to RB10 of which only RB1 and RB10 are shown, connects another group of ten leads to the windings of the prepare magnets 1PM to 0PM. Each of these ten leads is connected over contacts closed by hold magnet HA to a series arrangement of a make contact of the line relay and a break contact of the cut-off relay of all subscribers' lines having the same units digit. Thus when relay RB operates a circuit is completed from earth, contacts 11CO3 and IIL4 (Fig. 6), contacts 1HA1, RB1, winding of prepare magnet 1PM to battery as previously described. Prepare magnet 1PM operates and locks as before and at contacts 1PM3 completes a circuit over contacts RB11 and HB2 for hold magnet HB. Hold magnet HB operates, locks over contacts HB2 in parallel with hold magnets HA and closes the top set of level contacts 1HBP to 1HBT thereby registering to units digit of the calling line. Further at contacts HB1, relay HB opens the circuit of relay RB which releases and disconnects the ten units leads from the windings of the prepare magnets. It will be understood that, as with the ten tens leads, the ten units leads will be connected to the RB contacts in all the registers as indicated in Fig. 6.

Before proceeding to a description of the testing operation for an idle route by which the calling line may be connected to the seized register, the description of the circuits so far considered will be elaborated in order to draw attention to certain features which have not so far been made clear.

Returning to the circuit by which the register is seized it will be noted that the circuit for relay RA is opened at contact HA1 on the operation of hold magnets HA i. e. on the registration of the tens digit. Hence if another line in the same group as the calling line is placed in the calling condition after the tens digit of the line under consideration has been registered, the seizure of a register for the second line cannot immediately take place since the circuit of relay RA is now open while the operation of the release relay B of the seized register has not yet occurred and the seizing circuit is therefore not extended to the second choice register. The time required for selecting a route between a calling line and a register and for effecting the connection therebetween with the consequent operation of the register release relay is, however, so short that any delay for this reason may be regarded as immaterial.

It will be noted that battery is fed to the prepare magnets 1PM to 0PM over a chain circuit which includes contacts 1PM2 to 0PM2 of the prepare magnets connected in series whereby when one prepare magnet is operated, the chain circuit is opened so that battery is removed from the higher numbered magnets. For instance, when magnet 1PM operates, contacts 1PM2 open the chain circuit so that none of the magnets 2PM to 0PM can operate if earth is extended to them over the appropriate RA contact. It will thus be seen that if calls are initiated simultaneously from two lines in different groups having access to the same register either as first, second or subsequent choices, or from two lines in the same group with different tens digits, the line having the lowest tens digit will be dealt with first and the other line will wait until the operation of the release relay of the register transfers it to the second choice register.

On calls which are initiated from lines within the same group and having the same tens digit, the one having the lowest units digit is dealt with first. For instance, suppose that calls are simultaneously initiated from lines 11 and 12. Relay RA will operate followed by prepare magnet 1PM. Hold magents HA then operate and are followed by the release of relay RA and the operation of relay RB. Relay RB in operating at contacts RB1 and RB2 extends earth again to prepare magnets 1PM and 2PM of which 1PM only operates fully, due to the chain circuit, to connect line 11 to register REG1. Line 12 is then transferred to the second choice register on the operation of the release relay of register REG1.

With regard to the access paths between the lines and the registers, these are shown more clearly in Fig. 17 on the assumption that four registers are employed. This clearly indicates, as previously mentioned, that as regards register REG1, this is first choice to lines having the tens digits 1 and 2, while owing to the chain circuit connection in the battery feed to the primary magnets 1PM to 0PM, calls on lines 11 to 10 have first preference and calls on lines 21 to 20 have second preference. This will be seen from the drawing where contacts CO2 and L2 of lines 21 to 20 are connected over RA2 contacts in the registers to a lead extending to the prepare magnets 2PM in the registers. Again the register REG2 is the second choice for lines having the tens digits 1 and 2 but again the lines in group 11 to 10 have preference over the lines in group 21 to 20, and so on for the registers REG3 and REG4.

Looking at the question from the point of view of the registers, register REG1 is first choice to lines 11–20 of which lines 11–10 have first preference and lines 21–30 have second preference: it is second choice to lines 81–00 of which lines 81–80 have first preference, lines 91–90 have second preference and lines 01–00 have third preference: it is third choice to lines 61–70 of which lines 61–60 have first preference and lines 71–70 have second preference and it is fourth choice to lines 31–50 of which lines 31–30 have first preference, lines 41–40 have second preference and lines 51–50 have third preference. It is believed that the description of the arrangement of register REG1 will enable the arrangement of the other registers, which is similar to that of REG1, to be understood from a study of the Fig. 17.

It will be obvious that with four registers as shown a total of four calls may be set up simultaneously. It is, however, possible that the traffic in the exchange may be carried by only three registers in which case the start lead for lines 81–00, say, would be connected to the start lead for lines 61–70 and the front contact of B1 of register REG3 would be connected to the start lead of register REG1.

Finally it will be noted that the grouping of the lines is preferably effected in multiples of ten although the groups need not be of the same size.

Returning now to the setting up of the connection, the next operation to be performed is the testing of the availability of the route between the calling subscriber's line and the seized register. When relay RB releases on the operation of hold magnet HB as previously described, relay RC in register REG1 operates provided no other register is employed in testing the availability of the routes between it and another calling line i. e. provided none of the RC relays in the other registers are operated. Assuming no RC relays are operated, the circuit for relay RC of register REG1 extends as follows: earth, contacts RC11 normal (Fig. 11), normal contacts RC11 in the other registers contacts RCX1, HC1, RB12, HB3, winding of relay RC to battery. Relay RC operates and locks to earth at operated contacts RC11, these contacts in operating serving to open the chain circuit through the other registers to prevent the operation of an RC relay therein. Relay RC in operating closes a circuit at contacts RC12 (Fig. 10) for relay RCX which operates and at contacts RCX1 (Fig. 11), RCX2 (Fig. 5), RCX3 and RCX4 disconnects the locking earth provided by contacts RC11 from the lead by which earth is fed over the chain circuit. In addition relay RC at contacts RC1 to RC10 (Fig. 11) and RC13 to RC15 (Fig. 12) completes the test circuits for the first ten routes P*p*, P*q*, P*r*, P*s*, Q*p*, Q*q*, Q*r*, Q*s*, R*p* and R*q* and at contacts RC16 (Fig. 11) prepares a circuit for relay X. Referring to Fig. 18 which shows the test circuits in detail it will be seen that the test cutoff relays TCOP, TCOQ and TCOR of the finder-finals PFF, QFF and RFF normally connect earth to the back level contacts H1P1 to H0P1, H1Q1 to H0Q1 and H1R1 to H0R1 of the hold magnets of the finder-finals PFF, QFF and RFF. The front level contacts are connected to back level contacts 1HAP to 0HAP, 1HAQ to 0HAQ and 1HAR to 0HAR of the hold magnets HA in all the registers. The front level contacts 1HAP to 0HAP in each register are connected in parallel to a front contact of RC appropriate to the register, front level contacts 1HAQ and 0HAQ are connected in parallel to a second RC front contact while the front level contacts 1HAR to 0HAR are connected in parallel to a third RC front contact. The first RC back contact is connected in parallel to the back level contacts of hold magnets HF2P*p*, HF2P*q*, HF2P*r* and HF2P*s* of the secondary finders F2: the second RC back contact is connected in parallel to the back level contacts of hold magnets HF2Q*p*, HF2Q*q*, HF2Q*r* and HF2Q*s* while the third RC back contact is connected in parallel to the back level contacts of hold magnets HF2R*p* and HF2R*q*. The front level contacts of the hold magnets are connected individually to contacts RC1 to RC10 in each register.

In the connection which is being described, level contacts 1HAP, 1HAQ and 1HAR in register REG1 have been operated by the operation of hold magnet 1HA and consequently, assuming none of the level contacts H1P1, H1Q1 and H1R1 are open, test circuits are completed over these contacts, level contacts 1HAP, 1HAQ and 1HAR in register REG1, contacts RC13, RC14, RC15, level contacts HF2P*p*1 to HF2P*s*1, HF2Q*p*1 to HF2Q*s*1, HF2R*p*1 and HF2R*q*1, contacts RC1 to RC10 and thence to the winding of prepare magnets 1PM to 0PM on the further assumption that none of the hold magnet contacts of the secondary finders are open. Circuits are thus completed for the ten prepare magnets but owing to the chain circuit previously described, prepare magnet 1PM only will operate fully. As a result of the operation of prepare magnet 1PM, earth is extended over contacts 1PM3 and RC17, winding of hold magnet HC to battery. Hold magnet HC operates and locks over contacts HC2 in parallel with the other hold magnets and also closes level contacts 1HCA to 1HCG i. e. contacts in the first level selected by the operation of prepare magnet 1PM. Hold magnet HC, at contacts HC1 opens the circuit for relay RC which releases and at contacts RC12 opens the circuit for relay RCX. Further, in releasing, relay RC opens all the above described test circuits while relay RCX in releasing restores to normal the chain circuit through the registers so that the availability of the routes may now be tested by another register.

On the closing of level contacts 1HCA, a circuit is completed for the select magnet 1PFF of the finder-final PFF over earth, contacts B3 (Fig. 13), level contacts 1HCA, level contacts 1HBP, winding of prepare magnet 1PFF to battery. Further on the closing of level contacts 1HCB a circuit is completed for test cut-off relay TCOP (Fig. 7) as follows: earth, contacts B3 (Fig. 13), winding of relay SF, level contacts 1HCB, winding of relay TCOP to battery. Both relays TCOP and SF operate in this circuit and relay TCOP at contacts TCOP1 disconnects earth from the test circuit of routes P*p*, P*q*, P*r* and P*s* in order to prevent seizure of the finder-final PFF in the short interval between the selection of the route and the operation of relay B. In addition relay TCOP at contacts TCOP2 (Figs. 8 and 18) removes earth from test circuits employed on incoming calls to prevent the seizure of the finder-final on such a call during the same short interval. In addition the following circuit is now closed for the prepare magnet IF2U of the secondary finder F2: earth, contacts B3 (Fig. 13), HD3 (Fig. 14), HC3, 1HAB (Fig. 12), winding of prepare magnet 1F2U (Fig. 3) to battery. Prepare magnet 1F2U thus operates.

When relay SF operates as described above, the following circuit is completed for the hold magnet HF2P*p* of the secondary finder F2: earth, contacts 11L3 (Fig. 6) of the calling subscriber's line relay, contacts 1HAA, SF1, B4, 1HCC, hold magnet HF2P*p* to battery. The hold magnet operates a short interval after prepare magnet 1F2U owning to the time taken for relay SF to close contacts SF1. The operation of the hold magnet causes the closing of level contacts 1HF2P*p*A, 1HF2P*p*B and 1HF2P*p*C, selected by the operation of prepare magnet 1F2U. The operation of contacts 1HF2P*p*C now closes the following circuit for the hold magnet H1P of the finder-final PFF: earth, contacts 1HF2P*p*C, winding of hold magnet H1P (Fig. 1) to battery. Hold magnet H1P operates and closes level contacts 1H1PA, 1H1PB and 1H1PC selected by the operation of prepare magnet 1PFF. The closing of contacts 1H1PC extends earth from contacts H1P2 through the winding of the cut-off relay 11CO of the calling subscriber's line i. e. line 11, to battery. The cut-off relay operates and at contacts 11CO4 and 11CO5 and their back contacts opens the circuit of the associated line relay 11L and at their front contacts extends the subscriber's line conductors to the register over contacts 1H1PA, 1H1PB of the finder-final, contacts 1HF2P*p*A, 1HF2P*p*B of the secondary finder, contacts 1HCD, 1HCE of the crossbar switch in the register to battery through the upper winding of relay A and to earth through the lower winding of relay A contacts CB2 and HE1, secondary winding of the dial tone transformer DTT. Dial tone is now returned to the calling party.

Relay A now operates over the calling line and at contacts A1 (Fig. 10) closes a circuit for relay B as follows: earth, contacts ST1, BR1, A1, winding of relay B to battery. Relay B in operating at contacts B1 (Fig. 11) extends the start circuit for lines 11–20 to register REG2 as previously explained and it will be noted that the start circuit from line 11 will be opened at contacts 11CO1 when the cut-off relay operates before relay B operates. At contacts B2 (Fig. 12) relay B provides a direct earth instead of the temporary earth for maintaining hold relays H*a*, HB and HC. At contacts B3 (Fig. 13) relay B opens the circuit for relays TCOP and SF to render routes P*q*, P*r* and P*s* again available, assuming that P*p* is the only one in use and also opens the circuits for prepare magnets 1PFF and 1F2U which release in readiness for another call. At contacts B4 (Figs. 10 and 12), relay B provides an operating earth for certain relays in the impulse responding circuit and replaces the temporary earth for maintaining the hold magnet HF2P*p* of the secondary finder and hence the hold magnet HIP of the finder-final. Finally at contacts B5 (Fig. 10), relay B prepares a point in the circuit to relay CA.

Before proceeding to a description of the operations resulting from the transmission of impulses from the calling subscriber's dial switch, further consideration will be given to the operation of route testing. In the description given previously, it was assumed that all the routes in the first ten routes were available and accordingly the first route P*p* was selected. However, it will be seen by referring to Fig. 18 that if route P*p* is unavailable and contacts HF2P*p*1 are open, but the remaining routes are available, prepare magnet 2PM would be operated over contacts HF2PQ1 and RC2 and route P*q* would be selected. If contacts H1P1 are open, then irrespective of the condition of contacts HF2P*p*1, HF2P*q*1, HF2P*r*1 and HF2P*s*1, no circuits can be closed for any of the prepare magnets 1PM to 4PM. However, if contact H1Q1 is closed and one of contacts HF2Q*p*1, HF2Q*q*1, HF2Q*r*1, HF2Q*s*1, are closed then a circuit will be closed for one of prepare magnets 5PM to 8PM and one of the routes Q*p*, Q*q*, Q*r* and Q*s* will be selected. Finally if all these routes are unavailable a circuit for prepare magnet 9PM or 0PM may still be closed over contacts H1R1 and one of contacts HF2R*p*1 or HF2R*q*1. If all the ten routes are unavailable, however, relay X (Fig. 11), the circuit for which was completed at contacts RC16, will eventually operate due to the fact that no prepare magnet has been operated. Relay X in operating locks in parallel with the hold magnets over the following circuit: earth, contacts 11L3 (Fig. 6), contacts 1HAA, B2, Y1, X1, winding of relay X, contacts Y2, 0PM2 to 1PM2 in series to battery. At contacts X2 (Fig. 13) relay X completes the following circuit for hold magnet HC: earth, contacts X2, RD16, RC17, HC2, winding of HC to battery. Hold magnet HC operates but as no prepare magnet is operated, no contacts in any level are operated. Hold magnet HC locks over HC2 in parallel with the other operated hold magnets and at contacts HC1 opens the circuit for relay RC which releases. Relay RC in releasing opens the circuit for relay RCX, disconnects the ten test leads from prepare magnets 1PM to 0PM nad opens further points in the test circuits at contacts RC13, RC14 and RC15. In addition relay RC, at contacts RC18 completes the following circuit for relay RD: earth at contacts RD11, chain circuit including contacts RD11 in the other registers, contacts RDX1, HD1, RC18, X3, winding of relay RD to battery. Relay RD operates and locks direct to earth at operated contacts RD11, the operation of these contacts serving to open the chain circuit through the registers in a similar manner to contacts RC11. It will be noted that while one register only can test over a group of ten routes, two registers may simultaneously test over different groups since the circuits of RC and RD and the circuits controlled thereby are quite independent.

Relay RD in operating at contacts RD1 to RD10 connects 10 leads to the windings of the prepare magnets 1PM to 0PM, these leads forming part of the test circuits for the second ten routes R*r*, R*s*, S*p*, S*q*, S*r*, S*s*, Tp, Tq, Tr and Ts. It will be understood that these ten leads are similar to those connected up at contacts RC1 to RC10 relative to the first ten routes. Further relay RD in operating at contacts RD12 (Fig. 10) closes a circuit for relay RDX and finally at contacts RD13, RD14 and RD15, it completes further points in the test circuits to the second ten routes in a similar manner to contacts RC13, RC14 and RC15 for the first ten routes. Relay RDX at contacts RDX1, RDX2, RDX3 and RDX4 (Figs. 5 and 11) prevents the earth connection on the operated contact of RD11 becoming effective in the other registers.

The test circuits for the second ten routes are similar to those discussed for the first ten routes and the detailed circuits are again more clearly shown in Fig. 18. It is therefore not considered necessary to do more than describe the operation on the assumption that one route is available and it will be assumed that the route Rr is available. In this case the following circuit is completed: earth, contacts TCOR1, H1R1, 1HAR, RD13, RF2Rr1, RD1, winding of prepare magnet 1PM, contacts 1PM1, Z1 to battery.

Prepare magnet 1PM thus operates and locks over contacts 1PM1, at contacts 1PM2 it opens the chain circuit and at contacts 1PM3 it completes a circuit for hold magnet HD over contact RD16. Relay X also releases when the prepare magnet operates and at contacts X3 opens the circuit for relay RD which releases. Hold magnet HD in operating locks over HD2 in parallel with the other hold magnets and closes the set of contacts 1HDA to 1HDG selected by the operation of prepare magnet 1PM. Relay RD in releasing opens the test circuits for the second ten routes and the circuit for relay RDX which releases to enable any other register to test over the second ten routes, if required.

The connection of the calling line to the seized register over the selected route Rr is similar to its connection over route Pp and it is not considered that any further description of this operation is necessary.

If none of the second ten routes is available, relay Y, the circuit for which is prepared at contacts RD17, eventually operates over the chain circuit of the prepare magnet contacts since no prepare magnet operates in this case. Relay Y in operating at contacts Y1 opens the locking circuits of the holding magnets HA, HB, HC and HD which thereupon release. At contacts Y2, relay Y opens the circuit of relay X which releases and opens the circuit of relay RD as previously described. The circuit of relay Y is thus opened at contacts RD17 and the relay releases. The register is thus released but if line 11 is still in the calling condition, the release of hold magnet HA at contacts HA1 again completes a circuit for relay RA and the register is again set in operation. The test for an idle route can thus be repeated again and again. It will be understood that with certain calling lines the register may in subsequent tests be used by a line having a higher preference. This will not, of course, be the case with line 11 since no other line has a higher preference as regards register REG1 than this line. If desired relay Y may be a slow-to-release relay in order to introduce a time delay to prevent the repeated testing by the register at too frequent intervals.

Consideration will now be given to the reception of the impulse trains transmitted to the register from the calling subscriber's dial switch. On the break period of the first impulse of the first train, relay A releases and extends earth over contacts ST1 (Fig. 10), BR1, A1 and B5 to the winding of slow-to-release relay CA and also over contacts 4B1, 3B1, 2B1 and 1B1, winding of relay 1A to battery. Relays CA and 1A operate and relay CA at contacts CA1 completes a circuit over contacts 2DB1 and 1DB1 for relay 1DA which operates. At contacts CA2, relay CA completes a circuit for relay CB which operates, at contacts CA3, it provides a locking earth for the impulse-registering relays and at contacts CA4 it removes earth from the contact pyramid which is controlled by the impulse-registering relays and which extends to the prepare magnets 1PM to 0PM. Relay CB in operating, at contacts CB1 provides an alternative earth to contacts CA3, at contacts CB2 replaces earth through the dial tone transformer by direct earth thus disconnecting dial tone from the calling line, at contacts CB3 closes a point in the circuits extending over the contact pyramid and at contacts CB4 opens a point in the circuit of relay IR. Relay 1A in operating at contacts 1A1 prepares a locking circuit for itself which includes the winding of relay 1B, the circuit becoming effective at the end of the break period of the first impulse when relay A releases and removes earth from the left-hand side of the winding of relay 1A. The circuit extends from earth contacts CA3 or CB1, 2B2, winding of relay 1B, contacts 1A1, winding of relay 1A, battery. When relay 1B operates over this circuit, at contacts 1B1 it extends the impulsing circuit to the winding of relay 2A and at contacts 1B2 to 1B6 controls the circuits over the contact pyramid.

During the second break period, relay 2A operates and, at contacts 2A1 prepares a locking circuit for itself in series with the winding of relay 2B and contacts 3B2. This locking circuit is effective at the end of the break period, when relay 2B operates and at contacts 2B1 transfers the impulsing circuit to relay 3A, at contacts 2B2 opens the circuit for relays 1A and 1B which release and at contacts 2B4 to 2B6 controls circuits extending over the contact pyramid.

On the third break period, relay 3A is operated and prepares a locking circuit for itself over contacts 3A1 in series with the winding of relay 3B and contacts 4B2. This circuit is effective at the end of the break period and relay 3B operates. Relay 3B, at contacts 3B1 transfers the impulsing circuit to relay 4A, at contacts 3B2 opens the circuit for relays 2A and 2B which release and at contacts 3B4 and 3B5 controls circuits extending over the contact pyramid.

On the fourth break period, relay 4A is operated and prepares a locking circuit for itself over contacts 4A1 in series with the winding of relay 4B. This circuit is effective at the end of the break period and relay 4B operates. Relay 4B, at contacts 4B1 transfers the impulsing circuit to contacts 4C1, at contacts 4B2 opens the circuit for relays 3A and 3B which release, at contacts 4B3 completes the circuit for relay 4C which operates and at contacts 4B4 controls circuits extending over the contact pyramid. Relays 4A, 4B and 4C remain operated for all subsequent impulses of the train and relay 4C, at contacts 4C1 extends the impulsing circuit over contacts 3C1, 2B1, 1B1 to the winding of relay 1A, at contacts 4C2 closes a point in an additional holding for relays 3A and 3B and at contacts 4C3 prepares a point in the circuit to relay 3C.

On the fifth break period, relay 1A is again operated and is followed by relay 1B at the end of the break period. On the sixth break period relay 2A is again operated followed by relay 2B at the end of the break period, relays 1A and 1B then releasing. On the seventh break period relay 3A is again operated followed by relay 3B at the end of the break period, relays 2A and 2B then releasing. Relays 3A and 3B lock over contacts 4B2 and 4C2 and the operation of relay 3B at contacts 3B3 completes a circuit for relay 3C which in operating at contacts 3C1 transfers the impulse responding circuit back again to relay 1A, at contacts 3C2 prepares an alternative locking circuit for relays 2A and 2B and at contacts 3C3 prepares a point in the circuit of relay 2C. Relays 3A, 3B and 3C remain operated, together with relays 4A, 4B and 4C.

Hence on the eighth break period, relay 1A operates again followed by relay 1B at the end of the break period. On the ninth break period relay 2A operates again followed by relay 2B at the end of the break period and the two relays lock over 3B2 and 3C2. Relay 3C being operated at this time, the operation of relay 2B at contacts 2B3 completes a circuit for relay 2C which in operating at contacts 2C1 prepares an alternative holding circuit for relays 1A and 1B. Relays 2A, 2B and 2C remain operated. The tenth break period thus causes relay 1A to operate again followed by relay 1B at the end of the break period and these two relays now hold over 2B2 and 2C1 and remain operated.

It will thus be seen that the combination of relays which are operated for different incoming digits are as follows:

| Digit | 1 | 2 | 3 | 4 | 5 | 6 | 7 | 8 | 9 | 10 |
|---|---|---|---|---|---|---|---|---|---|---|
| Relays Operated | 1B | 2B | 3B | 4B | 1B, 4B | 2B, 4B | 3B, 4B | 1B, 3B, 4B | 2B, 3B, 4B | 1B, 2B, 3B, 4B |

At the end of the first impulse train, relay A will remain operated and relay CA will eventually release. Relay CA in releasing, at contact CA1 opens the original circuit for relay 1DA which now holds over contacts 1DA1, winding of 1DB, contacts 2DB2, B4 to earth. Relay 1DB operates in this circuit. Further relay CA, at contacts CA2 opens the circuit for relay CB, at contacts CA3 opens one of the holding circuits for the impulse-registering relays, these relays, however, being now held from earth at CB1. Finally relay CA, at contacts CA4 extends earth over the contact pyramid during the release period of relay CB to cause the operation of the appropriate one of the prepare magnets. Relay 1DB in operating, at contacts 1BB1 prepares a circuit for relay 2DA and at contacts 1DB2 (Fig. 14) prepares a circuit for hold magnet HE. Assuming the first digit dialled is "0" then relays 1B, 2B, 3B and 4B are operated and during the release period of relay CB, earth is extended over contacts CA4, CB3, 4B4, 3B4, 2B4, 1B2 to lead 0 and thence to prepare magnet 0PM. The prepare magnet operates and locks as previously described and at contacts 0PM3 extends earth over contacts 1DB2 to the hold magnets HE. Hold magnets HE operate and lock over HE2 and close level contacts 0HEA, 0HEB, 0HEP to 0HET and 0HE0 selected by the operation of prepare magnet 0MP. The first digit of the number of the called line is thus registered. Hold magnets HE, at contacts HE1 prepare an alternative direct earth connection to the lower winding of relay A to prevent the re-transmission of dial tone to the calling subscriber on the release of relay CB. It will be seen that the prepare magnet is only operated for the duration of the release time of relay CB and the impulse-registering relays are also released on the release of relay CB.

The second impulse train received from the calling subscriber's dial switch will be dealt with in a similar manner except that on the operation of relay CA on the first break period relay 2DA is operated by the closure of contacts CA1. On the release of relay CA at the end of the train, relay 2DB operates in series with relay 2DA. Relay 2DB in operating, at contacts 2DB1 opens a further point in the original circuit of relay 2DA, at contacts 2DB2 it opens the circuits of relays 1DA and 1DB which release and at contacts 2DB3 (Fig. 14) it closes a circuit for hold magnet HF. Assuming that the second digit of the called line is also "0," prepare magnet 0PM will again be operated so that the circuit for hold magnet HF will extend from earth at contacts 0PM3. The hold magnet HF in operating will lock over contacts HF1 and will close contacts 0HFA and 0HFP to 0HFT, selected by the operation of prepare magnet 0PM. The second digit is thus registered. It will be understood that the prepare magnet 0PM will again be operated only momentarily.

The registration of the digits of the called subscriber's number is now complete and the next operation is to determine whether the called line is busy or idle. For this purpose, since a busy line has either the line or cut-off relay operated, a make contact of each of these relays connected in parallel for each line is connected to contacts controlled by hold magnets HE and HF, which latter contacts are indicative of the number of the called subscriber. A relay in the register is operated over this circuit if the line is busy. In the example being considered where the subscriber's line is "0," the circuit will extend from contacts 00CO or 00L5 (Fig. 8) of line 00, contacts 0HE0, contacts 0HFA, IR1, to the winding of relay BR.

Assuming first that the required line is idle, contacts 00CO6 and 00L5 will be open and relay BR will not operate so that on the operation of the hold magnet and the release of relay CB, the following circuit (Fig. 10) is completed: earth, contacts HF2, CB4, BR2, winding of relay IR to battery. Relay IR operates and at contacts IR1, disconnects relay BR from the test circuit, at contacts IR2 and IR3 it completes circuits for relays RC and RG and at contacts IR4 it completes a circuit for relay Z over contacts Y2 and the chain circuit including contacts 1PM1 to 0PM1. With regard to the circuits for RC and RG, these will only be completed, as before, provided the RC relay in each of the other registers is not operated. The operation of relay RC and RG initiates a testing operation for an idle route from the calling subscriber's line to the called subscriber's line.

Relays RC and RG lock to earth over contacts HG1 and RC11 and relay RC, at contacts RC1 to RC10 extends ten leads to the windings of prepare magnets 1PM to 0PM. The windings of the prepare magnets, due to the operation of contacts Z1 to Z10 are connected to contacts RG1 to RG10 and thence to the ten further leads. In addition relay RC, at contacts RC11 completes the circuit for relay RCX which operates. This time the test circuits include not only the circuits shown on the left-hand side of Fig. 18, but also the circuits shown on the right-hand side of that figure. The circuits on the left-hand side of Fig. 18 have already been described while the circuits on the right-hand side extend over contacts TCOQ2, TCOR2 and TCOS2 of the test cut-off relays of the finder-finals QFF, RFF and SFF to level contacts H1Q3 to H0Q3, H1R3 to R0R3 and H1S3 to H0S3, H1P3 to H0P3 of the hold magnets of the finder finals QFF, RFF and SFF, level contacts 1HEQ to 0HEQ, 1HER to 0HER, 1HES to 0HES of the hold magnet HE in the register, contacts RG12, RG13 and RG14, level contacts HD1P*p*2 to HD1P*s*2, HD1Q*p*2 to HD1Q*s*2, HD1R*p*2 and HD1R*q*2 of the hold magnets of the first digit switches D1P*p* to D1P*s*, D1Q*p* to D1Q*s*, D1R*p* and D1R*q*, contacts RG1 to RG10 and thence to the windings of the prepare magnets 1PM to 0PM. In the case of the present connection, the digits of the called line are "00" so that contacts 0HEQ, 0HER and 0HES are operated. The first four test circuits thus extend over TCOQ2, H0Q3 and 0HEQ, the next four over TCOR2, H0R3 and 0HER and the remaining two over TCOS2, H0S3 and 0HES. On the left-hand side of Fig. 18, earth will be extended over back contacts TCOP1, TCOQ1 and TCOR1 of the test cut-off relays TCOP, TCOQ and TCOR of the finder-finals PFF, QFF and RFF, back level contacts H1P1, H1Q1 and H1R1 of the hold magnets of the finder-finals PFF, QFF and RFF which are available and which correspond to the tens digit of the calling line as determined by the contacts in series therewith namely 1HAP, 1HAQ and 1HAR, contacts RC13, RC14 and RC15, back level contacts of HF2P*p*1 to RF2P*s*1, HF2Q*p*1 to HF2Q*s*1, HF2R*p*1 and HF2R*q*1, contacts RC1 to RC10 and thence to the other side of the winding of the prepare magnet.

When the calling line was connected to the register over route P*p*, contacts H1P1 and HF2P*p*1 opened so that route P*p* would normally be unavailable. However, this route is made available for a through connection by extending earth at contacts RG11 (Fig. 13) through contacts 1HCG to the right-hand spring of contacts RC1. If there is a through circuit in any of these routes, at least one of the prepare magnets will be energised but the prepare magnet which operates will be the one with the lowest number as previously described. Assume, for example, that route P*p* is available. Prepare magnet 1PM then operates over the circuit, earth, contacts RG11, 1HCG, RC1, winding of prepare magnet 1PM, contacts RG1, HD1P*p*2, RG12, 0HEQ, H0Q3, TCOQ2 to battery. Prepare magnet 1PM operates and at contacts 1PM2 opens the chain circuit by which battery is applied to the windings of prepare magnets 2PM to 0PM thereby preventing the operation of any of these prepare magnets whose circuits may have been completed simultaneously with that of prepare magnet 1PM.

Prepare magnet 1PM in operating at contacts 1PM3 completes a circuit over contacts RG15 and HG2 for hold magnet HG. Hold magnet HG operates and locks over contacts HG2 to earth at contacts B2. Also hold magnet HG operates contacts 1HGA to 1HGE, selected by prepare magnet 1PM while at contacts HG1, it opens the circuit of relays RC and RG which release to open the circuit of the prepare magnet 1PM which also releases. The selected route is immediately busied by operation of test cut-off relay TCOP (Fig. 7) over the following circuit: earth, winding of relay ST (Fig. 15) contacts 1HGA, winding of relay TCOP to battery. Relay TCOP opens the test circuits for the P routes at contacts TCOP1 and TCOP2. In addition relay TCOQ (Fig. 7) is operated from earth at contacts 1HGB and opens the test circuits of the Q routes at contacts TCOQ1 and TCOQ2 in order to prevent the seizure of the route which includes the selected finder-final. Relay ST operates with results which will be described later.

It is now necessary to operate the switches to complete the connection between the calling and called lines over route P*p*. The circuit for the prepare magnet 1PFF of the primary finder extends from earth at contacts 1HGC (Fig. 15) contacts 1HBP winding of magnet 1PFF to battery. The prepare magnet of the secondary finder is also operated over the circuit: earth, contacts X4 (Fig. 14), HG3, 1HAB, winding of prepare magnet 1F2U to battery. It will be understood that since the route selected for the through connection is the same as that by which the calling line is connected to the register, the operation of prepare magnets 1PFF and 1F2U are ineffective at this time. A description will be given subsequently of the operation where the through route is different from the route by which the calling line is connected to the register. It is also necessary to operate a second prepare magnet of a primary finder in preparation for connecting the calling line with the called line. Now the connection of the calling line to the register is effected by the operation of hold magnet H1P so that the connection to the called line is effected over a finder-final other than primary switch PF, for example, primary switch QFF. In the arrangement shown for the selection of route P*p*, the prepare magnet 0QFF will be operated over the circuit: earth, contacts 1HGC (Fig. 15) 0HEQ, winding of 0QFF to battery. Finally the appropriate prepare magnet of the first digit selector must also be operated and this is effected over the circuit: earth, contacts X4 (Fig. 14), HG3, 0HEA, winding of prepare magnet 0D1U to battery.

As previously described, relay ST operates on the operation of hold magnet HS and at contacts ST1 (Fig. 10) opens the circuit for slow-to-release relay B and at contacts ST2 (Fig. 15) extends earth over contacts 1HGD for relay HR (Fig. 3) of the battery-feed relay set P*p*BF appropriate to route P*p*. Relay HR operates and at contacts HR1 provides a holding earth to replace that previously provided by contacts B3 of relay B. Further at contacts HR2 and HR3, relay HR connects up the calling line relay CLR. Also at contacts ST2, relay ST extends earth over contacts 1HGE, normal contacts HD1P*p*3, winding of hold magnet HD1P*p* of the first digit switch D1P*p* to battery. The hold magnet operates and locks over HD1P*p*3 to earth at contacts RTR2 in the battery-feeding relay set. Also hold magnet HD1P*p* closes contacts 0HD1P*p*A to 0HD1P*p*C selected by the prepare magnet 0D1U. Finally the appropriate hold magnet H0Q of the finder-final is operated from earth at contacts JR1, contacts 0HD1P*p*C, hold magnet H0Q to battery. The cut-off relay 0CCO of the called line 00 is now operated from earth, contacts H0Q2, 0H0QC, winding of relay 00CO to battery.

The connection to the called line from the battery-feeding relay set is now complete and a circuit is completed for the transmission of ringing current over the called line, the circuit extending as follows: battery, secondary winding of the ringing tone transformer RN (Fig. 3) lower winding of relay RTR, contacts TTR1, 0HD1P*p*A, 0H0QA, contacts 00CO4, called line, contacts 00CO5, 0H0QB, 0HD1P*p*B, contacts RTR2, to earth. Ring-back tone is also fed to the calling subscriber's line over the following circuit: earth, secondary winding of ring-back tone transformer RT (Fig. 3), contacts HD1P*p*1, RTR3, lower winding of relay CLR, contacts HR3, 1HF2P*p*B, 1H1PB, contacts 11CO5 of the calling line cut-off relay, subscriber's line, contacts 11CO4, 1H1PA, 1HF2P*p*A, HR2, upper winding of relay CLR to battery. Relay CLR operates in this circuit and at contacts CLR1 provides a local locking circuit for relay BR. At this time relay B, whose circuit was opened at contacts ST1 as previously described, reaches the end of its delay period and releases and in so doing opens the circuit of all the operated hold magnets and relays in the register which is thus available for setting up another connection.

On the reply of the called subscriber, relay RTR operates over the subscriber's loop, locks over RTR4 to earth at contacts HR1 and at RTR1 and RTR2 disconnects ringing current from the called line and connects talking battery to the called line over the windings of relay WLR. Finally relay RTR, at contacts RTR3 disconnects ring-back tone from the calling line and applies a direct earth to the lower winding of relay CLR, which provides a battery feed to the calling line. The circuit to the calling line thus extends from battery at the upper winding of relay CLR, contacts HR2, 1HF2P*p*A, 1H1PA, 11CO4, line 11, contacts 11CO5, 1H1PB, 1HF2P*p*B, HR3, lower winding of relay CLR to earth. The circuit to the called line extends from battery at the upper winding of relay WLR, contacts RTR1, 0HD1P*p*A, 0H0QA, 00CO4, line 00, contacts 00CO5, 0H0QB, 0HD1P*p*B, RTR2, lower winding of relay WLR to earth. Relay WLR energises over this circuit and could, if desired, be arranged to reverse the battery connections to relay CLR or control metering over a fourth lead. The speech path is completed by the capacitors connected between the upper and lower windings respectively of relays CLR and WLR.

On the termination of the connection, relay CLR will release when the calling party replaces his receiver and at contacts CLR1 will open the circuit of relay HR which releases and at contacts HR1 will open the circuit of the operated hold magnets in the finder-finals and the first digit switch and the circuit of relay RTR. The hold magnets and the relay release and the equipment is again available for use in another connection.

The preceding description of the setting up of the connection has been given on the assumptions, first, that the called line was idle and, second, that the first route P*p* in the first ten routes extending from the register to the called line was available. A description will now be given of the operations involved, first, if the called line is busy and, second, if the route P*p* is unavailable.

If the called line is busy, it will be seen that relay BR operates from earth either at contacts 00CO6 or COL5 of the cut-off relay or line relay of the called line. Relay BR in operating at contacts BR1 opens the circuit of relay B which releases slowly, at contacts BR2 prevents the operation of relay IR, which initiates route testing, at contacts BR3 closes a circuit for relay HR in the battery-feeding relay set P*p*BF and at contacts BR4 completes a circuit for relay Y which includes the chain circuit formed by the contacts of the prepare magnets 1PM to 0PM.

The circuit for relay HR extends as follows: earth, contacts BR3 (Fig. 13), 1HCF, winding of relay HR to battery. Relay HR operates and at contacts HR1 provides an alternative holding earth for hold magnets HF2P*p* which in turn maintains hold magnet H1P operated. Further relay HR at contacts HR3 closes the following circuit: earth, secondary winding of busy tone, transformer BT, contacts HD1P*p*1, RTR3, lower winding of relay CLR, contacts HR3, 1HF2P*p*B, 1H1PB, 11CO5, subscriber's line 11, contacts 11CO4, 1H1PA, 1HF2P*p*A, HR2, upper winding of relay CLR to battery. Busy tone is thus transmitted to the calling subscriber's line. Relay B in releasing at the end of its delay period, opens the circuit for all the hold magnets and relays in the register. These, therefore, release together with relay A and relay CLR now operates over the subscriber's line although it may have operated previously in parallel with relay A. Relay CLR in operating at contacts CLR1 provides a local holding earth for relay HR independent of contacts 1HCF. Relays CLR and HR and hold magnets H1P and HF2P*p* thus remain operated and busy tone is transmitted until the calling subscriber replaces his receiver. When this occurs, relay CLR releases followed by relay HR and the hold magnets H1P and HF2P*p* and the equipment is restored to normal.

As previously described, relay Y operates when contacts BR4 are closed. Relay Y at contacts Y1 (Fig. 12) opens a point in the original locking circuit of the hold magnets HA to HG to allow these hold magnets to release independently of an earth which may be fed over the L3 contacts (Fig. 6) and contacts 1HAA if another line in the group 11–10 is in a calling condition.

A more detailed description of the operation of route-testing for a through connection will now be given and it will be assumed that route P*p* is not available. There are now three alternatives, first that there is another route available which includes the same finder-final as the original route but a different secondary finder, for example, route P*q*. Second, the route available is quite distinct from the original route, for example route Q*p* and third that there is no route available in the first ten routes.

Consider first the case where route P*q* is available. Referring to Fig. 18, this will mean that contacts HD1P*p*2 are open but HD1P*q*2 are closed while contacts 0HEQ and H0Q3 are closed as before. Prepare magnet 2PM is thus operated and on the operation of hold magnet HG, the contacts in the second level of the bridge are operated. The circuits which are closed during the completion of the connection are similar to those previously described with the exception that they include different level contacts of the bridge controlled by hold magnet HG and consequently a different battery-feeding relay set is taken into use and a different hold magnet in the first digit and final selectors is operated.

Where the route Q*p* is the first available, the circuits are in general similar but there are one or two differences that should be noted. Thus prepare magnet 5PM is operated over the test circuit and test cut-off relay TCOR is operated instead of TCOQ to prevent the selected route Q*p* being seized by other registers. Further a different prepare magnet of the primary finder is operated in the connection from the calling line since the route for the through connection is different from the route for the initial connection to the register. In this particular case, prepare magnet 1QFF is operated. The same prepare magnet 1F2U in the secondary finder, is, however operated since the selected route extends over the same secondary finder as the initial route.

A different prepare magnet, namely 0RFF, is also operated in the primary finder when acting as the final selector, while hold magnets HD1Q*p* and H0R in the first digit selector and final selector respectively are operated. On the release of the register, the hold magnets of the switches involved in the selected route will be held operated from the appropriate battery-feeding relay set, in this case Q*p*BF. The hold magnets of the route P*p*, over which the initial connection was completed from the calling subscriber to the register, will, however, not be held from this battery-feeding relay set so that on the release of the register these hold magnets will release and the connection between the calling and called subscribers will extend entirely over route Q*p*.

It is now necessary to consider the case where there is no available route in the first ten routes, namely P*p* to P*s*, Q*p* to Q*s*, R*p* and R*q*. Relay X will then operate from earth at contacts RC1 (Fig. 11), winding of relay X, contacts Y2, contacts 0PM2 to 1PM2 to battery. Relay X operates and locks over contacts X1 to earth at contacts B2 and at contacts X2, relay X completes a circuit for hold magnet HG as follows: earth, contacts X2, RH15, RG15, HG2, winding of hold magnet HG to battery. Further relay X, at contacts X4 (Fig. 14), removes earth from contacts HG3 to prevent the operation of a prepare magnet at this time. Hold magnet HG operates and locks over contacts HG2 to earth at contacts B2 and at HG1 opens the circuit of relays RC and RG which release. A circuit is now completed for relays RD and RH as follows: earth, contacts RD11 in register REG1, similar contacts in series of all the other registers, contacts RDX1, HH1, Y3, X6, RG15, HG3 and HG5 in parallel, windings of relays RD and RH respectively to battery. Relays RD and RH operate and lock to earth at contact RD11 while relay RD at contacts RD12 closes a circuit for relay RDX with the results previously described. Finally relays RD and RH complete the through test circuits at contacts RD1 to RD10 and RH1 to RH10 for routes R*r*, R*s*, S*p* to S*s* and T*p* to T*s* in the same way as relays RC and RG completed similar test circuits for the first ten routes. The test circuits which are now closed are shown in detail in Fig. 18 and are similar to those for the first ten routes. Assuming one of the routes is available, the appropriate prepare magnet is operated followed by the operation of hold magnet HH (Fig. 15). Hold magnet HH locks over contacts HH2 and, assuming route R*r* is available, the first level of contacts 1HHA to 1HHE, is operated. Further the hold magnet at contacts 1H1 opens the circuit of relays RD and RH and these relays release, followed by relay RDX so that other registers can now test in the second ten routes.

Subsequent operations to complete the connection between calling and called subscribers over route R*r* are similar to those previously described for the connection P*p* and will not be further described.

If none of the second ten routes is available, relay Y will operate from earth at RD17, winding of relay Y, contacts 0PM2 to 1PM2 in series to battery. Relay Y in operating, at contacts Y5 closes the following circuit for relay HR in the battery-feeding relay set P*p*BP: earth, contacts HG6 (Fig. 13), Y5, 1HCF, winding of relay HR to battery. Relay HR in operating maintains the hold magnets of the finder-final and secondary finder as previously described while busy tone is now transmitted to the calling line over the circuit: earth, secondary winding of busy tone transformer BT, contacts HD1P*p*1, RTR3, lower winding of relay CLR, contacts HR3, 1HF2P*p*B, 1H1PB, 11CO5, calling line, contacts 11CO4, 1H1PA, 1HF2P*p*A, HR2, upper winding of relay CLR to battery. Relay CLR operates and provides a local locking circuit for relay HR at contacts CLR1. Relay CLR remains operated until the calling subscriber replaces his receiver.

In addition, relay Y, at contacts Y1 opens one point in the register holding earth provided at contacts B2 but since contacts Z11 are connected in parallel with contacts Y1 and relay Z is still operated, the holding earth is retained for the time being. However, contacts Y2 in operating open the circuit for relay Z which thereupon releases and the holding earth is removed, more particularly from the hold magnets and relay X, all of which thereupon release and the register is available for use on another call.

When the calling subscriber replaces his receiver, relay CLR releases followed by relay HR, the original circuit for which was opened on the release of the register. The release of relay HR causes the release of the hold magnets in the finder-final and secondary finder and all the equipment is now restored to normal.

I claim:

1. A testing circuit for a telecommunication exchange comprising a group of calling lines divided into sub-groups, groups of primary finders, each primary finder of a group giving access to a different sub-group of lines, groups of secondary finders, each group of secondary finders giving access in common to a group of primary finders, groups of first digit selectors each group of first digit selectors being individually associated with a group of secondary finders and each first digit selector of a group being individually associated with each secondary finder of the corresponding group, line identifying means which respond to the initiation of a call on one of said lines to register the identification of a calling line number including the sub-group to which the calling line belongs, a plurality of test devices, one for each secondary finder, a plurality of testing networks there being one testing network for each group of secondary finders, each testing network having a composite path made up of a plurality of separate paths in parallel one for each primary finder of a group, which composite path is made conductive through one of the separate parallel paths selected by said line identifying means and controlled in accordance with the condition by the primary finder with which the path is associated said composite path being in series with a plurality of branched paths each individual to a secondary finder and made conductive by the secondary finder to which such path is allotted when idle, said individual paths each including a testing device, lockout means associated with the testing devices to ensure that only one can operate at a time, operating circuits for a primary finder operated jointly under the control of said line identifying means and the operated testing device operating circuits for a secondary finder under the control of said line identifying means, and a register connector operated under control of said operated testing device to connect the selected secondary finder to a called line registration means whereby the calling line is connected to an idle called line register and to an idle first digit selector substantially instantaneously.

2. A testing circuit for a telecommunication exchange comprising a group of lines divided into sub-groups, groups of finder switches a plurality of first digit selectors each first digit selector being individually associated with a finder switch groups of final selectors each first digit selector giving access to a group of final selectors, the final selectors of a group each giving access to a different sub-group of lines, a plurality of called line registration means, means including a register connector for connecting a calling line to an idle called line registration means over at least one of said finder switches, test indicating means controlled by said registration means to respond if the called line is idle, a plurality of test devices one for each first digit selector, a plurality of testing networks there being one testing network for each group of first digit selectors and each of said testing networks having a composite path made up of a plurality of separate paths in parallel, one for each final selector of a group, which composite path is made conductive over one of said separate paths selected by said register and controlled in accordance with the condition of the final selector to which the selected path is allotted, said composite path being in series with a plurality of branched paths, each individual to a first digit selector and made conductive if the first digit selector to which the path is allotted is free, said individual paths each including a testing device and means controlled by said test initiating means for completing operative circuits for the testing devices, each circuit including an individual and a composite path of a network of each plurality in series associated with the switching stages required for setting up a connection, so that a testing device can only operate if a through path exists through a first digit selector and a final selector, operating circuits for the switches in the selected path controlled jointly by an operated testing device and the registering means to complete a connection, and a battery feeding set included in the connection which supplies ringing current to the called line and provides battery feed for the calling and called lines to enable conversation to take place.

3. A testing circuit for a telecommunication exchange comprising a group of lines divided into sub-groups, groups of finder switches, a plurality of first digit selectors each first digit selector being individually associated with a finder switch, groups of final selectors, each first digit selector giving access to a group of final selectors, the final selectors of a group each giving access to a different sub-group of lines, a plurality of called registration means, means including a register connector for connecting a calling line to an idle called line registration means over at least one of said finder switches, busy test means connected up by said registration means for testing the idle or busy condition of the called line and responding if the called line is busy, release means responsive to the busy condition of the called line to release the registration means, busy signalling means responsive to the operation of said release means to supply busy signalling to the calling line over the operated finder switch until the calling line hangs up and releases the connection, test indicating means controlled by said registration means to respond if the busy test means does not operate indicating that the called line is idle, a plurality of test devices one for each first digit selector, a plurality of testing networks there being one testing network for each group of first digit selectors and each of said testing networks having a composite path made up of a plurality of separate paths in parallel, one for a final selector of a group which composite path is made conductive over one of said separate paths selected by said register and controlled in accordance with the condition of the final finder to which the selected path is allotted, said composite path being in series with a plurality of branched paths, each individual to a first digit selector and made conductive if the first digit selector to which the path is allotted is free, said individual paths each including a testing device and means controlled by said test initiating means for completing operative circuits for the testing devices, each circuit including an individual and composite path of a network of each plurality in series associated with the switching stages required for setting up a connection, so that a testing device can only operate if a through path exists through a first digit selector and a final selector, operating circuits for the switches in the selected path controlled jointly by an operated testing device and the registering means to complete a connection and a battery feeding set included in the connection which supplies ringing current to the called line and provides battery feed to the calling and called lines to enable conversation to take place.

4. A telecommunication exchange comprising a group of lines divided into sub-groups, groups of primary finders functioning also as final selectors, each primary finder of a group giving access to a different sub-group of lines, groups of secondary finders each group of secondary finders giving access in common to a group of primary finders groups of first digit selectors each group of first digit selectors being individually associated with a group of secondary finders and each first digit selector of a group being individually associated with each secondary finder of the corresponding group, while each group of first digit selectors gives access to a different group of primary finders in their function as final selectors to that to which the associated group of secondary finders have access, line identifying means which respond to the initiation of a call on one of said lines to register the identification of a calling line number including the sub-group to which the calling line belongs, a plurality of test devices one for each secondary finder, a plurality of testing networks there being one testing network for each group of secondary finders, each testing network having a composite path made up of a plurality of separate paths in parallel one for each primary finder of a group, which composite path is made conductive through one of the separate parallel paths selected by said line identifying means and controlled in accordance with the condition by the primary finder with which the path is associated, said composite path being in series with a plurality of branched paths each individual to a secondary finder and made conductive by the secondary finder to which such path is allotted when idle, said individual paths each including a testing device, lock-out means associated with the testing devices to ensure that only one can operate at a time, operating circuits for a primary finder operated jointly under the control of said line identifying means and the operated testing device operating circuits for a secondary finder under the control of said line identifying means, a register connector operated under control of said operated testing device to connect the selected secondary finder to a called line registration means, busy test means connected up by said registration means for testing the idle or busy condition of the called line and responding if the called line is busy, release means responsive to the busy condition of the called line to release the register, busy signalling means responsive to the operation of said release means to supply busy signalling current to the calling line over the operated primary and secondary finders until the calling subscriber hangs up and releases the connection, test indicating means controlled by said registration means to respond if the busy test means does not operate indicating that the called line is idle, a second plurality of testing networks there being one testing network for each group of first digit selectors and each of said second plurality of testing networks having a composite path made up of a plurality of separate paths in parallel, one for each primary finder functioning as a final selector of a group, which composite path is made conductive over one of said separate paths selected by said register and controlled in accordance with the condition by the primary finder to which the selected path is allotted, said composite path being in series with a plurality of branched paths, each individual to a first digit selector and made conductive if the first digit selector to which the path is allotted is free and means controlled by said test initiating means for associating each testing network of the first plurality with a corresponding network of the second plurality whereby testing devices are connected individually in circuits each including an individual and composite path of a network of each plurality in series associated with the switching stages required for setting up a connection, so that a testing device can only operate if a through path exists through a primary finder functioning as a primary finder, a secondary finder having access thereto, a first digit selector connected to said secondary finder, a different primary finder functioning as a final selector, operating circuits for the switches in the selected path controlled jointly by an operated testing device and the line identifying and registering means to complete a connection, and a battery feeding set included in the connection which supplies ringing current to the called line and provides battery to the calling and called lines to enable conversation to take place.

5. A telecommunication exchange comprising a group of lines divided into sub-groups, groups of primary finders functioning also as final selectors each primary finder of a group giving access to a different sub-group of lines, groups of secondary finders each group of secondary finders giving access in common to a group of primary finders, groups of first digit selectors each group of first digit selectors being individually associated with a group of secondary finders and each first digit selector of a group being individually associated with each secondary finder of the corresponding group, while each group of first digit selectors gives access to a different group of primary finders in their function as a final selectors to that to which the associated group of secondary finders have access, line identifying means which respond to the initiation of a call on one of said lines to register the identification of a calling line number including the sub-group to which the calling line belongs, a plurality of test devices, one for each secondary finder, a plurality of testing networks there being one testing network for each group of secondary finders, each testing network having a composite path made up of a plurality of separate paths in parallel one for each primary finder of a group, which composite path is made conductive through one of the separate parallel paths selected by said line identifying means and controlled in accordance with the condition by the primary finder with which the path is associated, said composite path being in series with a plurality of branched paths each individual to a secondary finder and made conductive by the secondary finder to which such path is allotted when idle, said individual paths each including a testing device, lock-out means associated with the testing devices to ensure that only one can operate at a time, operating circuits for a primary finder operated jointly under the control of said line identifying means and the operated testing device, operating circuits for a secondary finder under the control of said line identifying means, a plurality of called line registration means, a register connector operated under control of said operated testing device to connect the selected secondary finder to a called line registration means, holding means in the called line registration means for maintaining the operated finder switches, busy test means connected up by said registration means for testing the idle or busy condition of the called line and responding if the called line is busy to release said holding means and release the registration means, busy signalling means responsive to the release of said holding means to supply busy signalling current to the calling line over the operated primary and secondary finders and maintain the finders independently of the called line registration means until the calling line hangs up and releases the connection, test indicating means controlled by said registration means to respond if the busy test means does not operate indicating that the called line is idle, a second plurality of testing networks there being one testing network for each group of first digit selectors and each of said second plurality of testing networks having a composite path made up of a plurality of separate paths in parallel, one for each primary finder functioning as a final selector of a group, which composite path is made conductive over one of said separate paths selected by said register and controlled in accordance with the condition by the primary finder to which the selected path is allotted, said composite path being in series with a plurality of branched paths, each individual to a first digit selector and made conductive if the first digit selector to which the path is allotted is free and means controlled by said test initiating means for association each testing network of the first plurality with a corresponding network of the second plurality whereby testing devices are connected individually in circuits each including an individual and composite path of a network of each plurality in series associated with the switching stages required for setting up a connection, so that a testing device can only operate if a through path exists through a primary finder functioning as a primary finder, a secondary finder having access thereto, a first digit selector connected to said secondary finder, a different primary finder functioning as a final selector, operating circuits for the switches in the selected path controlled jointly by an operated testing device and the line identifying and registering means to complete a connection, a battery feeding set included in the connection which supplies ringing current to the called line and provides battery to the calling and called lines to enable conversation to take place and holding means included in said battery feeding set for maintaining the finder switches last operated independent of the called line registration means whereby the finder switches first taken into use are released.

6. A telecommunication exchange comprising a group of lines divided into sub-groups, groups of primary finders functioning also as final selectors each primary finder of a group giving access to a different sub-group of lines, groups of secondary finders, each group of secondary finders giving access in common to a group of primary finders, groups of first digit selectors, each group of first digit selectors being individually associated with a group of secondary finders and each first digit selector of a group being individually associated with each secondary finder of the corresponding group, while each group of first digit selectors gives access to a different group of primary finders in their function as final selectors to that to which the associated group of secondary finders have access, line identifying means which respond to the initiation of a call on one of said lines to register the identification of a calling line number including the sub-group to which the calling line belongs, a plurality of test devices, one for each secondary finder, a plurality of testing networks, there being one testing network for each group of secondary finders, each testing network having a composite path made up of a plurality of separate paths in parallel, one for each primary finder of a group, which composite path is made conductive through one of the separate parallel paths selected by said line identifying means and controlled in accordance with the condition by the primary finder with which the path is associated, said composite path being in series with a plurality of branched paths each individual to a secondary finder and made conductive by the secondary finder to which such path is allotted when idle, said individual paths each including a testing device, lock-out means associated with the testing devices to ensure that only one can operate at a time, operating circuits for a primary finder, operated jointly under the control of said line identifying means and the operated testing device operating circuits for a secondary finder under the control of said line identifying means, a plurality of called line registration means a register connector operated under control of said operated testing device to connect the selected secondary finder to a called line registration means holding means in the called line registration means for maintaining the operated finder switches, busy test means connected up by said registration means for testing the idle or busy condition of the called line and responding if the called line is busy to release said holding means and release the registration means, busy signalling means responsive to the operation of said release means to supply busy signalling current to the calling line over the operated primary and secondary finders until the calling subscriber hangs up and releases the connection, test indicating means controlled by said registration means to respond if the busy test means does not operate indicating that the called line is idle, a second plurality of testing networks there being one testing network for each group of first digit selectors and each of said second plurality of testing networks having a composite path made up of a plurality of separate paths in parallel, one for each primary finder functioning as a final selector of a group, which composite path is made conductive over one of said separate paths, selected by said registration means and controlled in accordance with the condition by the primary finder to which the selected path is allotted, said composite path being in series with a plurality of branched paths, each individual to a first digit selector and made conductive if the first digit selector to which the path is alloted is free and means controlled by said test initiating means for associating each testing network of the first plurality with a corresponding network of the second plurality whereby testing devices are connected individually in circuits each including an individual and composite path of a network of each plurality in series associated with the switching stages required for setting up a connection, so that a testing device can only operate if a through path exists through a primary finder functioning as a primary finder, a secondary finder having access thereto, a first digit selector connected to said secondary finder a different primary finder to be available for the second testing operation functioning as a final selector, short circuiting means controlled by the first testing operation to enable the finders used to connect the calling line to the registration means, operating circuits for the remaining switches if the selected path includes the finder switches initially used controlled by an operated testing device and the registration means to complete a connection and if the selected path does not include the finder switches initially used controlled jointly by an operated testing device and the line identifying and registration means to complete a connection, a battery feeding set included in the connection which supplies ringing current to the called line and provides battery to the calling and called lines to enable conversation to take place, and holding means included in said battery feeding set for maintaining the operated finder switches independent of the called line registration means whereby the finder switches operated for the through connection from calling to called line differ from the finder switches operated to connect calling line to registration means, the last mentioned finder switches being released.

7. A testing network for ascertaining the availability of a path involving a switch in each of at least two switching stages in a telecommunication system comprising a source of potential, a plurality of pairs of normally closed contacts one pair for each of the switches of each stage except the last, opened when the associated switch is busy, a plurality of pairs of normally open contacts, one pair connected in series with each of said pairs of normally closed contacts, common connections for the contacts of each one of the pair of normally closed contacts which is not connected to a contact of the normally open contacts, common connections for the contacts of each one of the pair of normally open contacts which is not connected to a contact of the normally closed contacts, one of which common connections is connected to one terminal of said source of potential, a second plurality of pairs of normally closed contacts one pair for each of the switches of the last stage having one contact of each pair connected together and to the other of said common connections, a plurality of testing devices one for each of said second plurality of pairs of contacts and having one terminal connected in common to another terminal of said source of potential and another terminal individually connected to the other contact of each of the second plurality of pairs of normally closed contacts whereby a circuit is only completed for a testing device which includes normally closed contacts of a switching device in each stage, the switching device of one stage at least being determined by the selective operation of an associated normally open contact.

8. A testing network for ascertaining the availability of a path involving a switch in each of a primary and secondary finder stage in a telecommunication system comprising a source of potential, a plurality of pairs of normally closed contacts one pair for each of the primary finder switches opened when the associated finder switch is busy, a pair of normally open contacts connected in series with each pair of normally closed contacts, selective means for operating at least one particular pair of said normally open contacts, a plurality of common connections one such connection for a contact of each of a proportion of such plurality of pairs of normally closed contacts, a second plurality of common connections one such connection for a contact of each of the said proportion of said plurality of pairs of normally open contacts, which said contact is not connected to a contact of the normally closed contacts, one of which plurality of common connections is connected to one terminal of said source of potential, a second plurality of pairs of normally closed contacts, one pair for each of the secondary finder switches having one contact of each pair of a proportion of said second plurality which proportion is not necessarily the same as the first proportion connected to one of said other plurality of common connections, testing devices connected to another terminal of said source of potential and individually to a contact of the second plurality of pairs of normally closed contacts belonging to the respective secondary finder switches whereby a circuit is only completed for a testing device which includes normally closed contacts of a primary and secondary finder switch.

9. A test circuit for a telecommunication system comprising a group of lines divided into sub-groups, groups of primary finder switches each group giving access to each line of a sub-group of lines, a plurality of groups of secondary finder switches each group giving access in common to a number of primary switches each of which primary switches gives access to a different sub-group of lines, group identifying means responsive to the initiation of a call on a line independently of said finder switches, a pair of normally closed contacts individual to each of said primary and secondary switches and opened when the switch to which it is individual is taken into use, a pair of normally open contacts individual to each pair of normally closed contacts which are individual to said primary switches and are selectively closed under control of said group identifying means, a plurality of test devices each of which is connected in series in a circuit including a source of current, a normally closed contact of a secondary switch and, in common with circuits from normally closed contacts of other secondary switches, sets of pairs of contacts, each set comprising a normally open and a normally closed contact in series for each sub-group of lines whereby a circuit is completed for each test device in a circuit including an idle secondary finder and an idle primary finder which gives access to a sub-group of lines including the calling line.

10. A test circuit for a telecommunication system comprising a group of lines divided into sub-groups, groups of final selector switches each group giving access to each line of a sub-group, a plurality of groups of digit selector switches giving access to a number of primary switches each of which gives access to a different sub-group of lines, called line designation means responsive to signals transmitted over one of said lines when a call is initiated thereon to register the designation of a called party, a pair of normally closed contacts individual to each of said digit and final selector switches open when the switch to which it is individual is taken into use, a pair of normally open contacts in series and individual to each pair of normally closed contacts whch are individual to each of said final selector switches which normally open contacts are selectively closed under control of said called line designation means, a plurality of test devices each of which is connected in series in a circuit including a source of current, a normally closed contact of a digit selector switch and, in common with circuits extending from other first digit selector switch contacts, sets of contacts in parallel each set comprising one pair of said normally open and one pair of said normally closed contacts in series associated with a final selector switch whereby a circuit for a test device is completed if a final selector switch giving access to the sub-group of lines including the called line is idle and at least one first digit selector giving access to said final selector is idle.

11. A test circuit for a telecommunication system comprising a group of lines functioning both as calling and called lines and divided into sub-groups, groups of primary finder switches giving access to each line of a sub-group of lines when calling, groups of final selector switches each group giving access to each line of a sub-group of lines when called, a plurality of groups of secondary finder switches each group giving access to a number of primary switches each of which gives access to a different sub-group of lines when calling, a plurality of groups of digit selector switches in at least one stage giving access to a number of final selector switches each of which gives access to a different sub-group of lines when called, group identifying means responsive to the initiation of a call on one of said sub-groups of calling lines to indicate the sub-group to which the calling line belongs, called line designation means responsive to signals transmitted from a calling line to a register the sub-group of called lines to which the called line belongs, a pair of normally closed contacts individual to each primary and secondary finder switch and to each digit and final selector switch, a pair of normally open contacts individual to each pair of normally closed contacts individual to each primary finder switch and each final selector switch which are selectively closed under control of said identifying and said designation means respectively, a plurality of test devices each connected in a circuit including a source of current, a pair of normally closed contacts of a secondary finder and a digit selector switch and sets of pairs of contacts in parallel, each set comprising one of said normally open, and one of said normally closed contacts in series associated with said primary finder switch, sets of pairs of contacts in parallel each set comprising one of said normally open and one of said normally closed contacts in series associated with said final selector switches, whereby a circuit for a test device is completed only if a primary finder switch giving access to the sub-group of lines including the calling line is idle, the final selector circuit giving access to the sub-group of lines including the called line is idle, and secondary finder and digit selector switches for completing the connection between the idle primary finder switch and the idle final selector switch are both idle.

12. A testing circuit for a telecommunication system comprising a plurality of switches arranged in stages whereby a group of switches of one stage has access to a number of groups of switches of a succeeding stage, selecting means operable in accordance with the connection desired, a normally non-conductive device linked to each switch, means for causing a non-conducting device selected by said selecting means to be conductive, means controlled by each switch for preventing the non-conductive device linked to it from being made conductive when said switch is engaged, multiplying means for connecting corresponding terminals of a non-conductive device linked with a switch of each of the groups of a succeeding stage, a testing network comprising a number of parallel paths each comprising a normally non-conductive device linked with the switch of the first stage and a set of non-conductive devices linked with switches of the second stage and connected by said multipling means, a plurality of testing devices, one for each of said paths, and a source of current connected in said testing network whereby a testing device in a path which is made conductive by said selecting means responds to determine in conjunction with said selecting means switches to be operated to complete the connection desired.

References Cited in the file of this patent

UNITED STATES PATENTS

| | | |
|---|---|---|
| 2,093,242 | Humphries et al. | Sept. 14, 1937 |
| 2,315,705 | Holden et al. | Apr. 6, 1943 |
| 2,587,817 | Busch et al. | Mar. 4, 1952 |
| 2,629,019 | Lesigne | Feb. 17, 1953 |